United States Patent
Gottfurcht et al.

(10) Patent No.: US 7,020,845 B1
(45) Date of Patent: Mar. 28, 2006

(54) NAVIGATING INTERNET CONTENT ON A TELEVISION USING A SIMPLIFIED INTERFACE AND A REMOTE CONTROL

(76) Inventors: Elliot A. Gottfurcht, 1018 Hartzell, Pacific Palisades, CA (US) 90272; Grant E. Gottfurcht, 1018 Monument, Pacific Palisades, CA (US) 90272; Albert-Michel C. Long, 5 Cannes, Irvine, CA (US) 92614

(*) Notice: Subject to any disclaimer, the term of this patent is extended or adjusted under 35 U.S.C. 154(b) by 722 days.

(21) Appl. No.: 09/518,015

(22) Filed: Mar. 3, 2000

Related U.S. Application Data

(63) Continuation-in-part of application No. 09/440,214, filed on Nov. 15, 1999, now Pat. No. 6,600,497.

(51) Int. Cl.
G06F 9/00 (2006.01)

(52) U.S. Cl. .............. 715/853; 715/748; 715/762; 715/810; 715/811

(58) Field of Classification Search ............. 345/659, 345/655, 661, 676, 705, 742, 748, 760, 761, 345/762, 763, 810, 811; 707/501.1, 515; 715/513, 515, 501.1
See application file for complete search history.

(56) References Cited

U.S. PATENT DOCUMENTS

| | | | |
|---|---|---|---|
| 4,706,121 A | 11/1987 | Young | |
| 5,479,268 A | 12/1995 | Young et al. | |
| 5,758,126 A | 5/1998 | Daniels et al. | |
| 5,801,702 A | 9/1998 | Dolan et al. | |
| 5,809,204 A | 9/1998 | Young et al. | |
| 5,896,133 A | 4/1999 | Lynch et al. | |
| 5,911,145 A * | 6/1999 | Arora et al. | 345/853 |
| 5,956,681 A | 9/1999 | Yamakita | |
| 5,958,012 A | 9/1999 | Battat et al. | |
| 6,028,600 A | 2/2000 | Rosin et al. | |
| 6,072,483 A | 6/2000 | Rosin et al. | |
| 6,078,866 A | 6/2000 | Buck et al. | |
| 6,154,205 A | 11/2000 | Carroll et al. | |
| 6,199,098 B1 * | 3/2001 | Jones et al. | 709/203 |
| 6,226,642 B1 | 5/2001 | Beranek et al. | |
| 6,260,192 B1 | 7/2001 | Rosin et al. | |
| 6,269,361 B1 | 7/2001 | Davis et al. | |
| 6,295,057 B1 | 9/2001 | Rosin et al. | |
| 6,345,279 B1 * | 2/2002 | Li et al. | 707/104.1 |

(Continued)

FOREIGN PATENT DOCUMENTS

WO   WO 01/75678   * 10/2001

OTHER PUBLICATIONS

Charles Heinemann, "Going from HTML to XML", Microsoft Corporation, Nov. 5, 1998.*

(Continued)

*Primary Examiner*—Kristine Kincaid
*Assistant Examiner*—Peng Ke
(74) *Attorney, Agent, or Firm*—Morrison & Foerster LLP

(57) ABSTRACT

A method and apparatus of simplified navigation. A web page is provided having a link to a sister site. The sister site facilitates simplified navigation. Pages from the sister site are served responsive to actuation of the sister site link. In one embodiment, the sister site includes matrix pages to permit matrix navigation.

36 Claims, 28 Drawing Sheets

U.S. PATENT DOCUMENTS

| | | | |
|---|---|---|---|
| 6,388,714 B1 * | 5/2002 | Schein et al. | 348/563 |
| 6,397,387 B1 | 5/2002 | Rosin et al. | |
| 6,401,132 B1 * | 6/2002 | Bellwood et al. | 709/246 |
| 6,411,307 B1 | 6/2002 | Rosin et al. | |
| 6,417,873 B1 * | 7/2002 | Fletcher et al. | 345/853 |
| 6,418,441 B1 * | 7/2002 | Call | 707/10 |
| 6,438,540 B1 * | 8/2002 | Nasr et al. | 707/3 |
| 6,460,181 B1 * | 10/2002 | Donnelly | 725/50 |
| 6,476,825 B1 * | 11/2002 | Croy et al. | 345/716 |
| 6,532,312 B1 * | 3/2003 | Corkran | 382/284 |
| 6,535,888 B1 | 3/2003 | Vijayan et al. | |

OTHER PUBLICATIONS

Chieko Asakawa, "User Interface of a Home Page Reader," Apr. 15, 1998, 8 pages, ASSETS '98, Marina del Rey, California.

Susan Decker, "Google Seeks to Invalidate Rival Overture's Web Search Patent", www.detnews.com, Jun. 20, 2002.

Stephanie Olsen and Gwendolyn Mariano, "Overture Sues Google Over Search Patent", www.news.com, Apr. 5, 2002.

Danny Sullivan, "Overture Files Patent Lawsuit Against Google", searchenginewatch.com, May 6, 2002.

* cited by examiner

Thursday, February 17, 2000      Yahoo!      Page: 1

YAHOO!

What's New    Check Email          Personalize    Help

Yahoo! Mail
free email for life    [ ]      Free Internet Access

[ Search ] advanced search

Shopping - Auctions - Yellow Pages - People Search - Maps - Travel - Classifieds - Personals - Games - Chat - Clubs
Mail - Calendar - Messenger - Companion - My Yahoo! - News - Sports - Weather - TV - Stock Quotes - more...

Yahoo! Shopping - Thousands of stores. Millions of products.

| Departments | Stores | Products |
|---|---|---|
| • Apparel   • Flowers | • Toys R Us | • Digital cameras |
| • Bath/Beauty   • Food/Drink | • Gap | • Pokemon |
| • Computers   • Music | • Vermont Teddy Bear | • MP3 players |
| • Electronics   • Video/DVD | • Macy's | • DVD players |

In the News
• Clinton urges Congress to back Congo force
• Windows 2000 debut
• NASA releases NEAR asteroid images
more...

Arts & Humanities
Literature, Photography...

News & Media
Full Coverage, Newspapers, TV...

Marketplace
• Loan Center - auto loans, mortgages, credit reports
• Yahoo! Bill Pay - free 3-month trial
• Yahoo! Autos - buy new and used cars
more...

Business & Economy
Companies, Finance, Jobs...

Recreation & Sports
Sports, Travel, Autos, Outdoors...

Computers & Internet
Internet, WWW, Software, Games...

Reference
Libraries, Dictionaries, Quotations...

Education
College and University, K-12...

Regional
Countries, Regions, US States...

Inside Yahoo!
• Yahoo! Outloud - featuring Smash Mouth
• Y! Mobile - Yahoo! on your phone
• Play free Fantasy Auto Racing
• Y! Greetings - free greeting cards
more...

Entertainment
Cool Links, Movies, Humor, Music...

Science
Animals, Astronomy, Engineering...

Government
Elections, Military, Law, Taxes...

Social Science
Archaeology, Economics, Languages...

Health
Medicine, Diseases, Drugs, Fitness...

Society & Culture
People, Environment, Religion...

World Yahoo!s    Europe : Denmark - France - Germany - Italy - Norway - Spain - Sweden - UK & Ireland
Pacific Rim : Asia - Australia & NZ - China - Chinese - HK - Japan - Korea - Singapore - Taiwan
Americas : Brazil - Canada - Mexico - Spanish Yahoo! Get Local    LA - NYC - SF Bay - Chicago - more...

Other    Autos - Careers - Digital - Entertainment - Greetings - Health - Invites - Local Events - Net Events
Message Boards - Movies - Music - Real Estate - Small Business - Y! Internet Life - Yahooligans!

Yahoo! Prefers   VISA

How to suggest a Site - Company Info - Privacy Policy - Terms of Service - Contributors - Openings at Yahoo!

Copyright © 2000 Yahoo! Inc. All rights reserved.
Copyright Policy http://www.yahoo.com/

FIG. 2C

FIG. 10G excellent# NAVIGATING INTERNET CONTENT ON A TELEVISION USING A SIMPLIFIED INTERFACE AND A REMOTE CONTROL This is a continuation-in-part of Ser. No. 09/440,214, entitled AN APPARATUS AND METHOD FOR SIMPLE WIDE-AREA NETWORK NAVIGATION, filed Nov. 15, 1999, now U.S. Pat. No. 6,600,497.

BACKGROUND (1) Field of the Invention

The invention relates to electronic information services and electronic commerce services. More specifically, the invention relates to providing easy navigation to facilitate access to such services and improved web access through a television display, internet appliance, and wireless devices.

(2) Background

The importance of the Internet as a tool of electronic commerce can not be overstated. The ability of consumers to buy products, obtain information from the comfort of their own home is revolutionizing the way business is done. Increasingly, there is a push to provide access to the Internet on standard television monitors through the use of set top boxes. Over time, much like cable-ready televisions, it is expected that Internet-ready televisions will proliferate. Unfortunately, even on large screen televisions the web surfing experience is poor, inasmuch as the web content is illegible and/or unnegotiable, unless you happen to be sitting very close to the television. Generally, this makes web surfing impractical in more traditional television environments. As the television web access systems proliferate, improved navigation and content access on the television is likely to become a necessity.

BRIEF SUMMARY OF THE INVENTION

A method and apparatus of simplified navigation is disclosed. A web page is provided having a link to a sister site. The sister site facilitates simplified navigation. Pages from the sister site are served responsive to actuation of the sister site link. In one embodiment, the sister site includes matrix pages to permit matrix navigation.

BRIEF DESCRIPTION OF THE DRAWINGS

FIG. 2b is an exemplary first matrix page of a sister site for the web page of FIG. 2a.

FIG. 2c is a web page having irregular segmentation.

FIGS. 10a–g are a series of matrix layers displayed during an exemplary navigation using one embodiment of the invention.

DETAILED DESCRIPTION

A simplified system for navigation of the Internet or other content source allows access to the content and services available thereon with greater ease, on, for example, a display more remote from a user than in the use of the "traditional" personal computer (PC) two foot paradigm.

Figure 1:
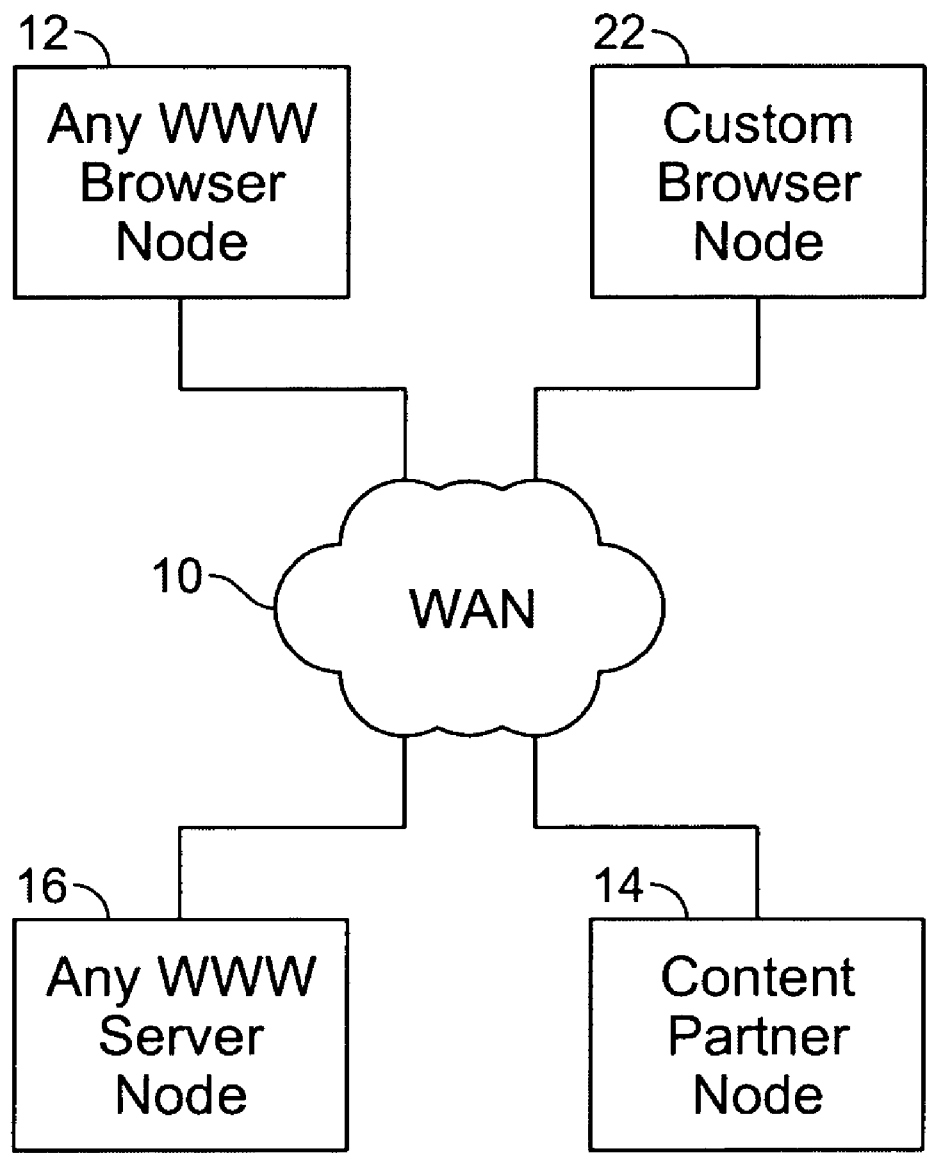
FIG. 1 is a block diagram of a system employing one embodiment of the invention.

FIG. 1 is a block diagram of a system employing one embodiment of the invention. A wide-area network (WAN) 10, such as the Internet, couples together a plurality of communication nodes. Some nodes, such as node 12, may be a standard prior art PC executing any conventional web browser. Alternatively, node 12 might be a set top box and television, or an internet appliance, or a wireless device, such as a web-enabled cell phone. Additionally, there are server nodes connected to WAN 10, such as server node 16, which may be any conventional web server. Also coupled to WAN 10 are browser nodes 22 running a custom browser that facilitate access to information and services provided to the custom browser node 22. The custom browser node 22 as well as any browser nodes 12 are collectively referred to as client nodes. Content partners, such as content partner node 14 provide content in a specified format that facilitates its use by the client nodes 12, 22. In one embodiment, when a user accesses a content partner home page, they have the option of linking to a sister site. As used herein, "sister site" is deemed to mean a site that provides for navigation of the site using a simplified navigation system, such as matrix navigation described in more detail below. In one embodiment, the sister site is traditional HTML pages converted to a matrix format to permit matrix navigation. This conversion may be done using an XML transcoding or any other suitable language.

Content partners may maintain a database of sister site web pages corresponding to the pages in the general use site. Alternatively, content partners may provide a facility for converting web pages on the fly to the sister site format. Content partners may also provide for segmentation of the base HTML web pages and/or the matrix pages. A segmentation may be performed in a number of ways. The page may be divided up based on content or area. The net result, in any case, is that the web page is divided into regions which are not necessarily, but may be, of equal size. The individual regions may be brought into focus independently. By "brought into focus," the concept of focus in this context is analogous to the front window in a windowing system. The focus region is deemed active and subject to client manipulation. In the context of a matrix page, one suitable segmentation is by cell, e.g., each cell corresponds to a region that may be independently brought into focus. The borders of the regions may or may not be visible on the web pages displayed. This segmentation facilitates tab, scroll, and zoom features described in more detail below. Alternatively, segmentation may be performed as part of a custom browser on custom browser nodes or may be instantiated as a hardware or firmware solution within, for example, the set top box.

Figure 2A:
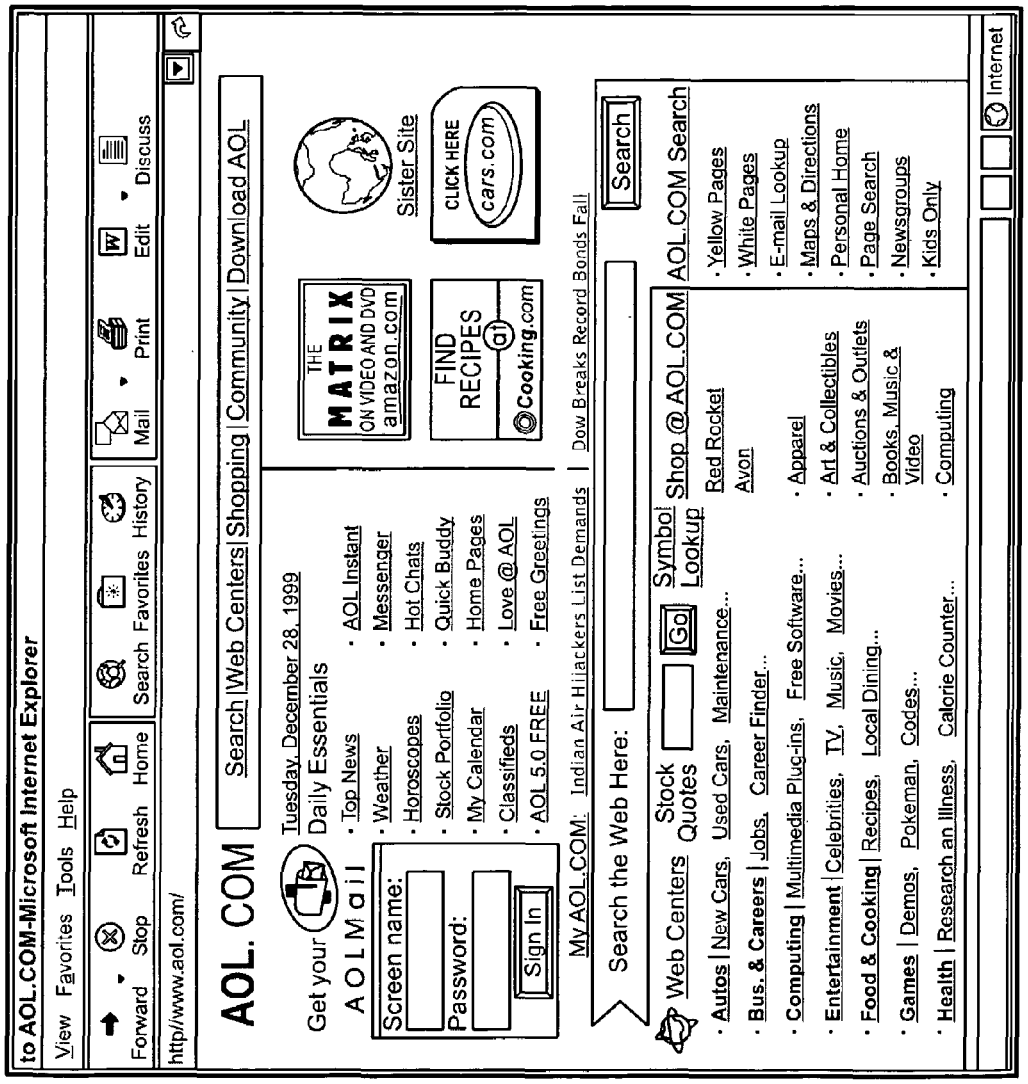
FIG. 2a is an exemplary web page having a sister site link.
Figure 2B:
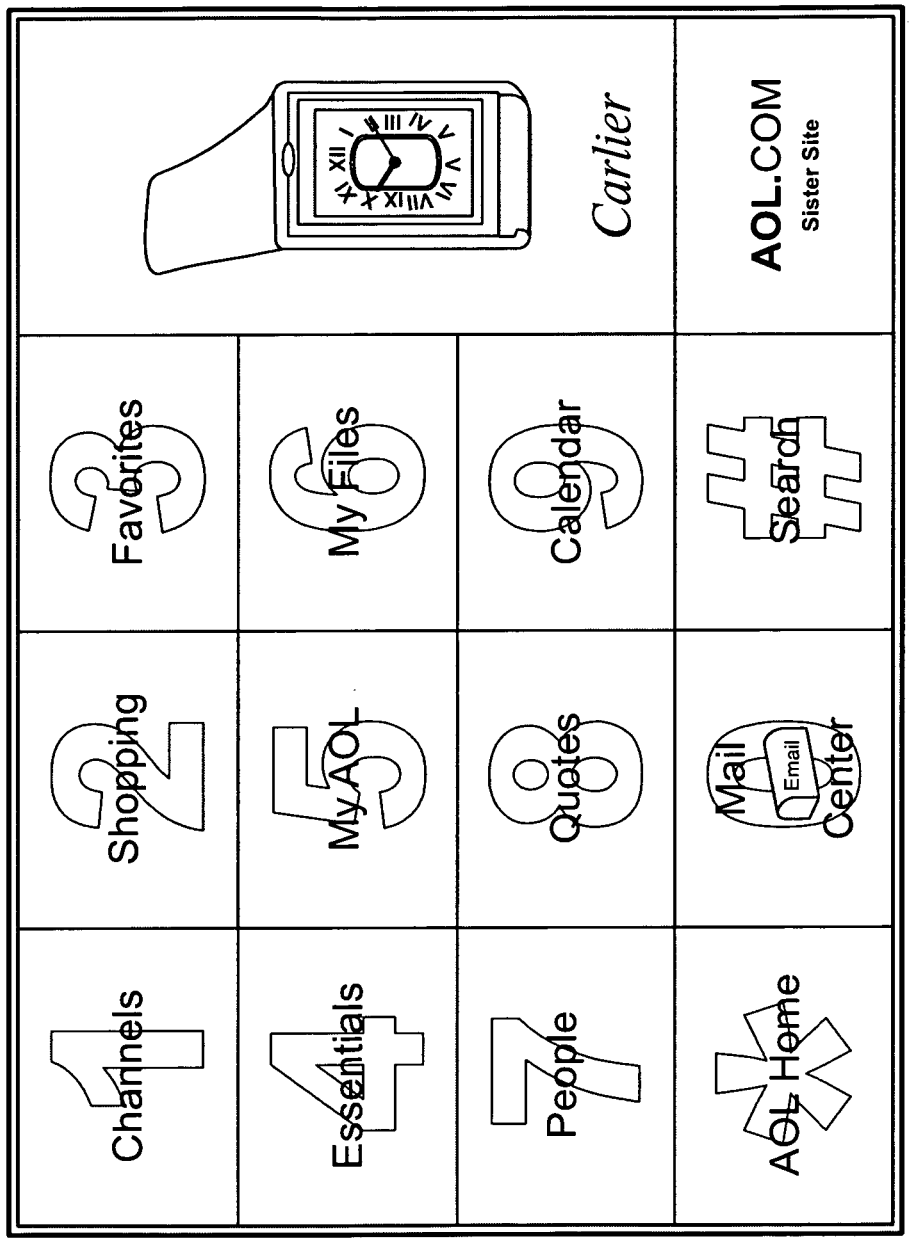

FIG. 2a is an exemplary web page having a sister site link. By actuating the link, the client begins receiving matrix pages as described in more detail below. FIG. 2b shows an example first matrix page reached by activating the sister site link in FIG. 2a. FIG. 2c is a web page having irregular segmentation. Through segmentation, the page is divided into regions. Individual regions may then be brought into focus permitting simplified navigation, viewing, and manipulation of the data within that region.

Figure 3:
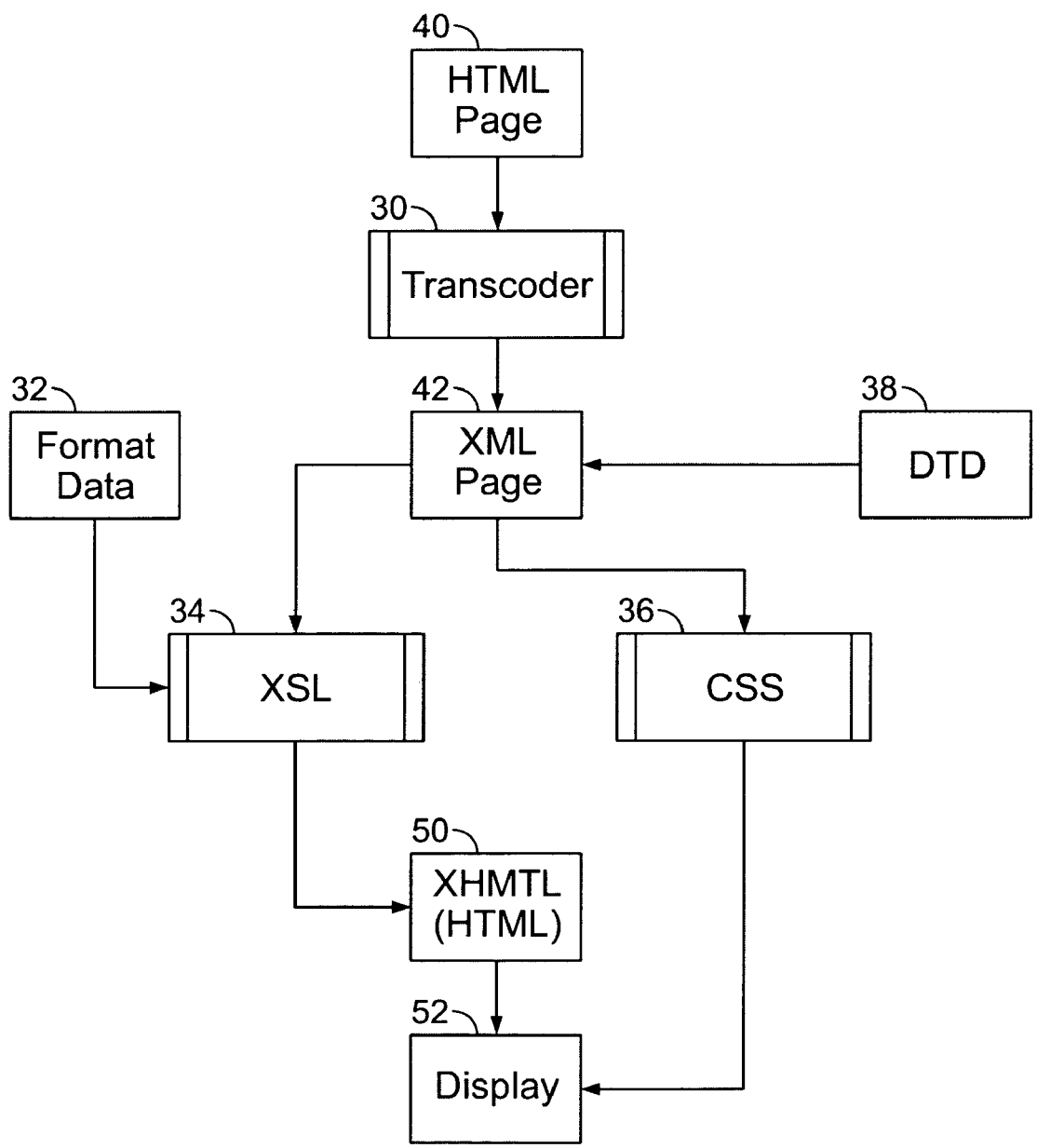
FIG. 3 is a flow diagram of conversion of standard HTML pages to a sister site format in one embodiment of the invention.

FIG. 3 is a flow diagram of conversion of standard HTML pages to a sister site format in one embodiment of the invention. A hypertext markup language (HTML) page 40 is transcoded by a transcoder 30 to yield, for example, an XML page 42 to which a document type definition (DTD) 38 is applied. The DTD 38 specifies the rules for the structure of the resulting XML document. The XML page is then reformatted using extensible style language (XSL) 34 to corresponding format data 32. XSL is not currently supported by all standard browsers. Thus, after formatting, the XML document is translated to an extensible hypertext markup language (XHTML) document for subsequent display by a client side browser on display 52. Alternatively, the XML page may have a cascading style sheet (CSS) applied to achieve the desired format. One advantage of the CSS is that it is supported by standard browsers. After application of the CSS, the resulting formatted page can be displayed by the client browser on display 52.

The above-described conversion may be done by a content partner in advance of request for pages or may be done on the fly responsive to requests for pages. The determination of which to do involves a trade off between latency in providing requested pages and storage space required to store the additional pages. Some on the fly conversion is desirable in the event that a user attempts to access a web site that has not previously been converted. It is also within the scope and contemplation of providing for conversion on the client side.

Figure 4:
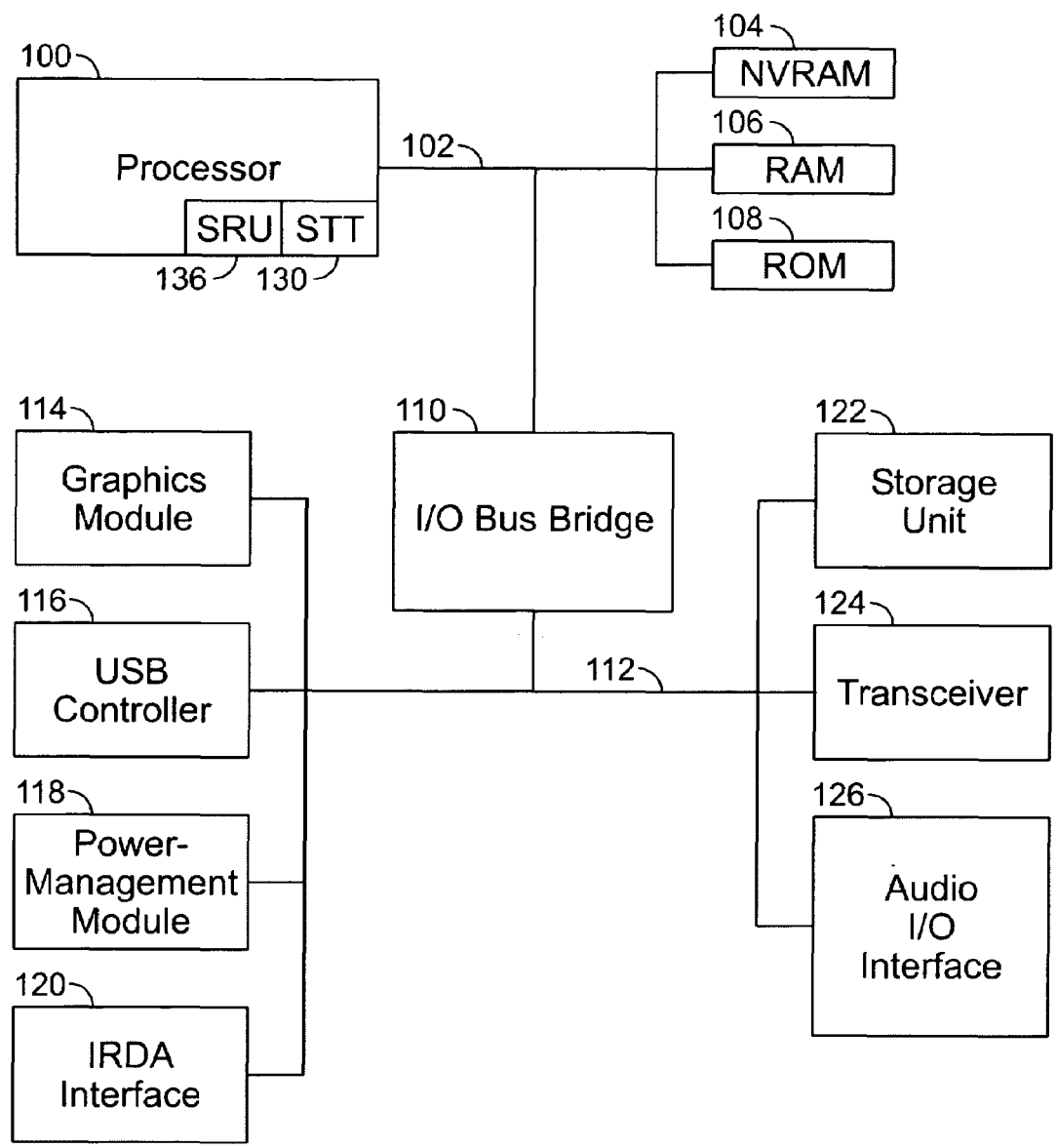
FIG. 4 is a block diagram of a client hardware architecture of one embodiment of the invention.

FIG. 4 is a block diagram of a client hardware architecture of one embodiment of the invention. A processor 100 is coupled to various memory units and an I/O bus bridge 110 by a local bus 102. Among the expected memory units are random access memory (RAM) 106, which may be any standard RAM, including standard dynamic random access memory (DRAM), and may be symmetric or asymmetric. Also coupled to bus 102 is a read-only memory (ROM) unit 108. The ROM will typically include the boot code for the processor 100. A non-volatile RAM (NVRAM) unit 104 is also coupled to the bus.

The I/O bus bridge 110 is coupled to the local bus 102 and bridges to the I/O bus 112. A number of units may reside on the I/O bus, including a graphics module 114 that couples to a display (not shown), a universal serial bus (USB) controller that may couple the system to any number of additional USB devices. Common USB devices include keyboards, mice, cameras, scanners, printers, and other peripheral components and input/output devices. Also coupled to the I/O bus may be power management module 118, which may be coupled to the power switch and may include conventional power conservation protocols, ensuring the processor 100 is permitted to orderly conclude its current operation before changing power states.

An infrared data association (IrDA) interface 120 permits the terminal to be coupled to hand-held devices, if desired. In some embodiments, a keyboard may be coupled by an Ir link. Storage unit 122, which may, for example, be a flash memory unit, is used for long-term storage of data or files. A transceiver 124 is used to permit the processor to communicate with the hub, whether it be a point-to-point link or across a wide-area network. The transceiver 124 may be, but is not limited to, an ethernet transceiver, a modem, digital subscriber line (DSL) or cable modem. It is expected that the processor 100 will communicate through the transceiver 124 to the server using transmission control protocol/internet protocol (TCP/IP). Encryption and compression within the terminal may be handled by conventional hardware or software solutions.

Audio I/O interface 126 may include an internal microphone and speaker which permits audio input and output. This is particularly useful in the context of voice e-mail or voice over IP communications. Additionally, some embodiments of the invention will include speech to text (STT) capability 130 and speech recognition (SR) capability 136. Various embodiments may implement these capabilities as hardware or software or a combination of both. In embodiments having SR capability, for simplicity of use, it is desirable to use one of the multiple user SR packages available today and expected to improve in the future, as these packages avoid the necessity of "training" the system. This permits recognition of content of speech and conversion to text.

For purposes of reduced cost, it may be desirable to use a particularly simple speech recognition package, recognizing only, for example, numbers and letters. A suitable speech recognition package will permit a user to navigate the WAN as subsequently described using voice commands and composed e-mails in a hands-free manner. Such an embodiment has the additional advantage that it enables Internet access to the physically challenged. In some embodiments, SR 136 is present, but STT 130 is not. This may permit the processor to respond to voice commands but would not permit composition of e-mail, for example.

In one embodiment of the invention, the terminal has a notebook form factor with an integrated LCD display. In an alternative embodiment, the form factor is a set-top box, which relies on an external display, such as a television or external monitor. In either case, a standard QWERTY keyboard could be used. In the set top box embodiment, a wireless keyboard or remote is desirable.

Figure 5A:
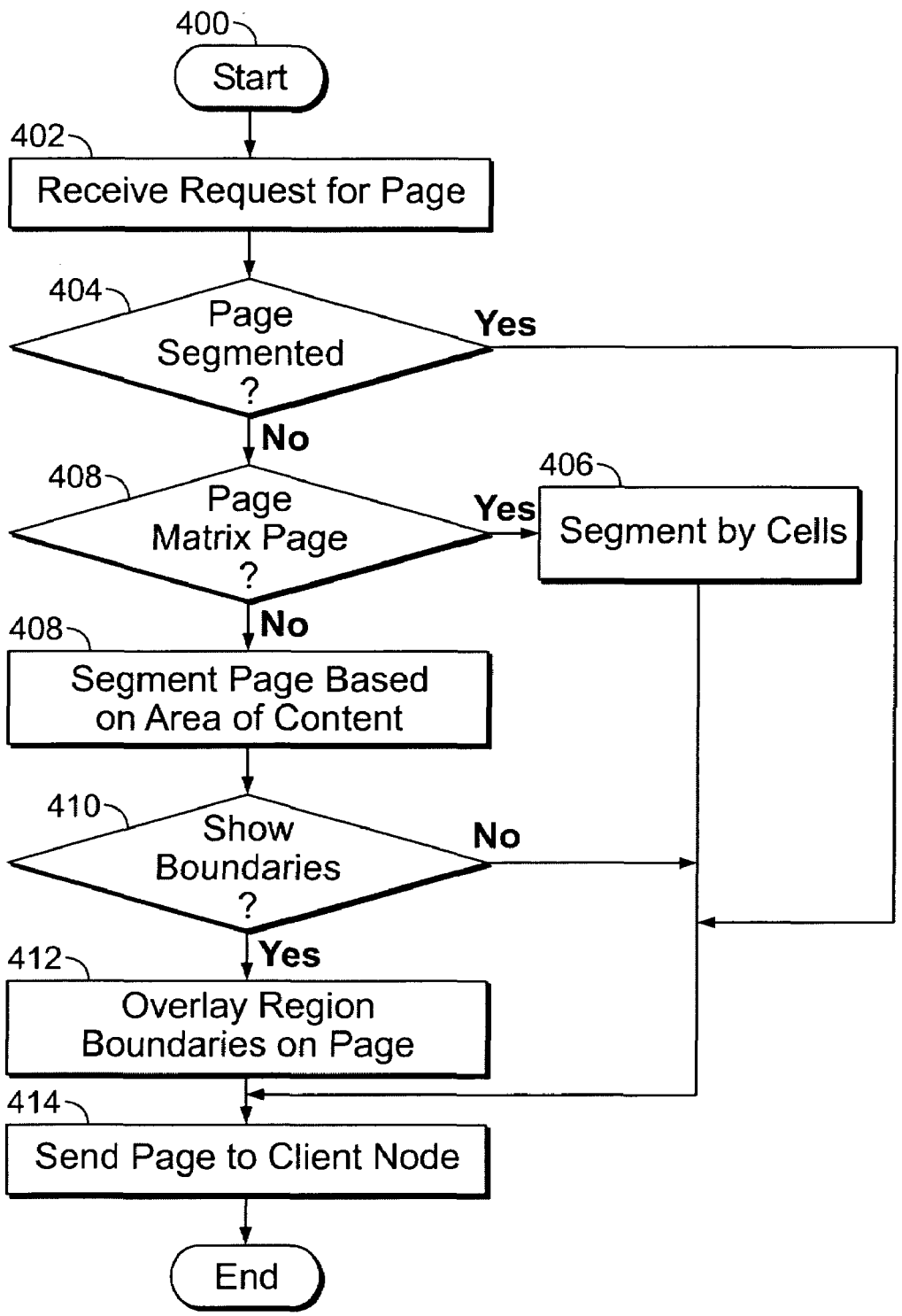
FIG. 5a is a flow diagram of server side segmentation in one embodiment of the invention.

FIG. 5a is a flow diagram of server side segmentation in one embodiment of the invention. A request for a page is received at functional block 400. A determination is made at decision block 402 whether the requested page has been segmented. If the page has not been segmented, a determination is made at decision block 404 whether the requested page is a matrix page. If the requested page is a matrix page, at functional block 406, the cells of the matrix are each defined to be a region, thereby completing the segmentation. If the page is not a matrix page, the page is segmented either based on area or content. By "segmentation," it is meant that the page is divided into a plurality of regions. The regions may contain one or more links and/or some amount of content. This segmentation facilitates usability as discussed in more detail below. Once segmentation is complete, at functional block 408, a determination is made if the boundaries of the regions should be shown on the displayed page at decision block 410. If the boundaries are to be shown, the boundaries are overlayed on the page at functional block 412 after the overlay, or if no boundaries are to be shown, the page is sent to the client node at functional block 414.

Figure 5B:
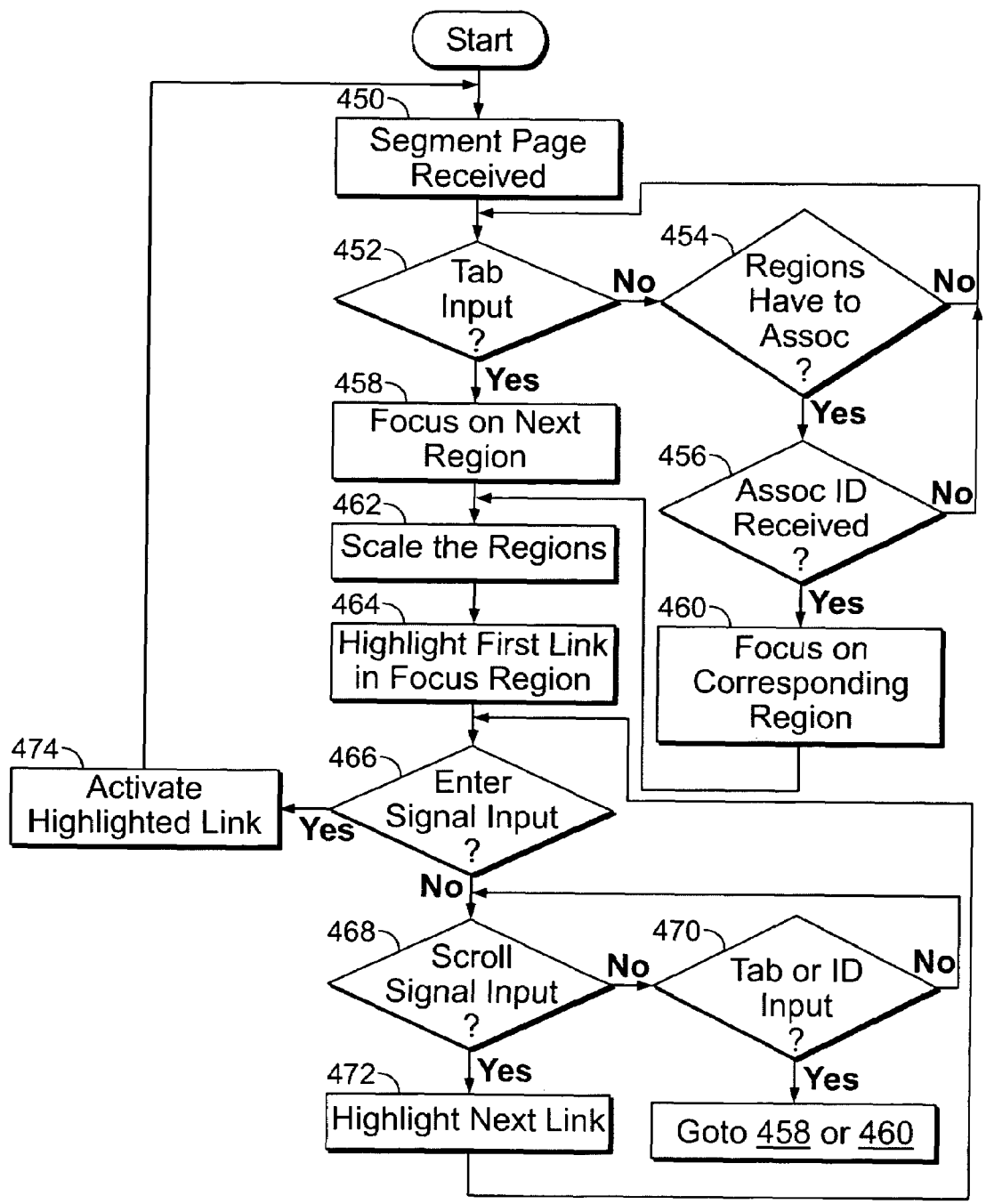
FIG. 5b is a flow diagram of client side manipulation of a segmented page in one embodiment of the invention.

FIG. 5b is a flow diagram of client side manipulation of a segmented page in one embodiment of the invention. At functional block 450, a segmented page is received at a client node. A determination is made at decision block 452 if a tab input has been received. As used herein, a tab input is any input which brings about the functionality of moving the focus from one region to another adjacent region. If no tab input has been received, a determination is made at decision block 454 if the regions have identifying symbols associated therewith. Particularly in the case of matrix pages, the different cells typically have associated therewith either an alphanumeric character or some symbol such as an asterisk or other punctuation mark to identify the cell. If there are identifications associated with the regions, a determination is made at decision block 456 if such an identification has been received as an input on the client node. If the identification has been received, the corresponding region is brought into focus. The focus region is active, and in some embodiments, the corresponding region is zoomed to increase its size relative to the inactive regions at functional block 460. If no identifications are associated with the region or no identification is received, the client waits for a tab input at decision block 452.

If a tab input is received, the next region is brought into focus. If no region is currently in focus, a first region, e.g., the uppermost leftmost region, will be brought into focus at functional block 458. At functional block 462, the regions are scaled so that the in focus region is enlarged relative to the regions which are not in focus. This is particularly desirable for web browsing in a television context where distance from the set may make reading the unscaled page difficult or impossible. Thus, by scaling region by region, readability within the region can be enhanced to permit use and browsing from a distance.

At functional block 464, a first link in the focus region is highlighted. As used herein, "highlighted" means made active such that a subsequent input, such as a predefined key press activates the link. Highlighting in the link context is analogous to focus in the region context. Highlighting may, but need not include, changing the link's appearance in any manner on the display such as, for example, changing size, color, shading, etc. A determination is made at decision block 466 if an enter signal has been received. However, if no enter signal has been received, a determination is made at decision block 468 if a scroll signal has been input at the client node. If a scroll signal has been input, a next link is highlighted at functional block 472. If an enter signal is received at functional block 466, a then highlighted link is activated at functional block 474 and a next segmented page is received, and the process begins again. Alternatively, if no scroll signal input is received at decision block 468, a determination is made at decision block 470 whether a tab or identification input has occurred. If it has, the system continues processing at blocks 458 or 460, respectively.

Figure 5C:
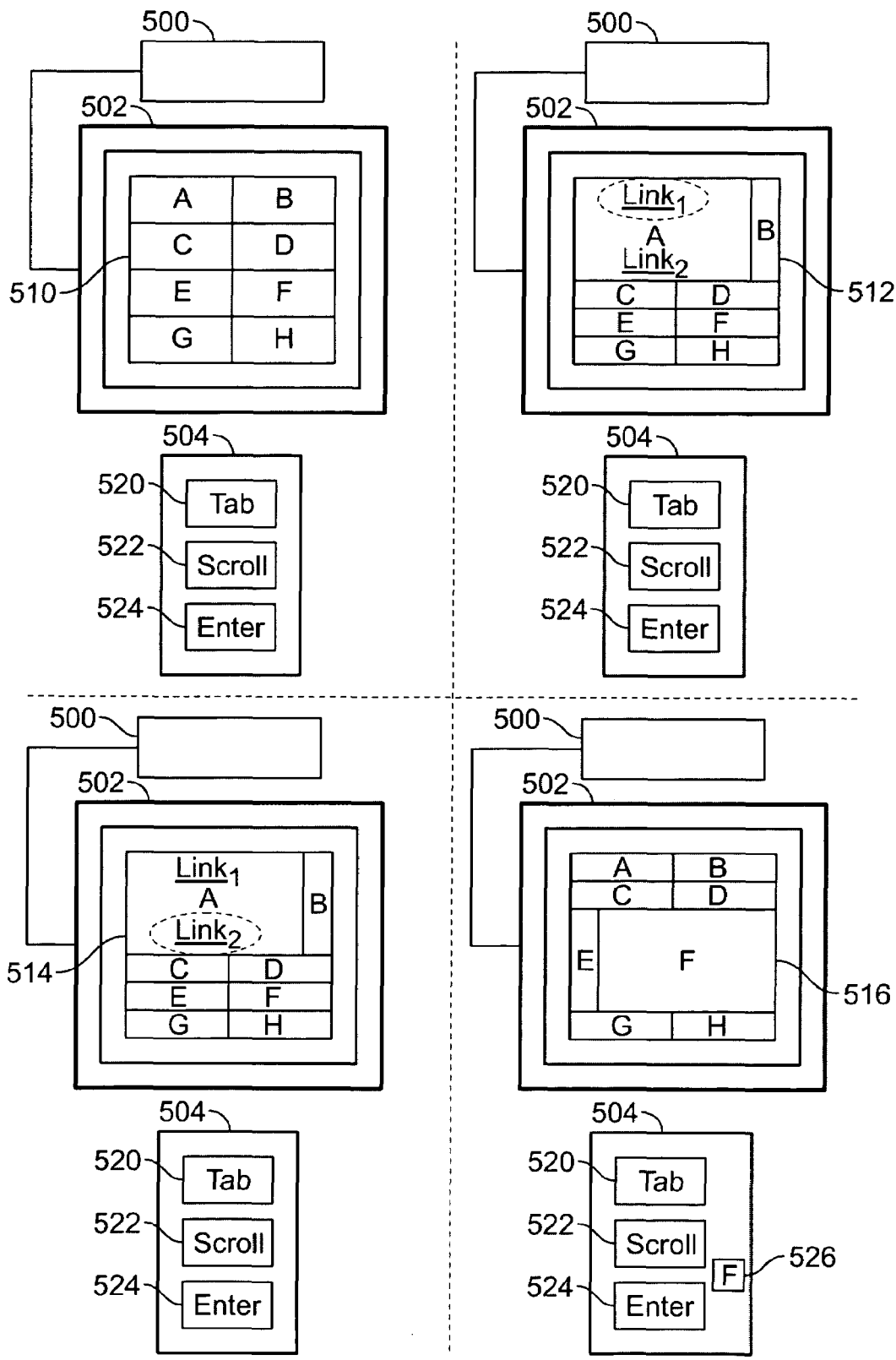
FIG. 5c is a diagram showing a system implementing the tab, scroll, and zoom features of one embodiment of the invention.

FIG. 5c is a diagram showing a system implementing the tab, scroll, and zoom features of one embodiment of the invention. A set top box 500 is coupled to a television monitor 502 and is responsive to remote control 504. Remote control 504 may be a custom remote control, a wireless keyboard, or even a standard universal remote control. Remote control 504 may be equipped with a microphone for accepting voice commands or may merely provide push button inputs. In frame one, television 502 is displaying a web page 510 that has been segmented into eight equally dimensioned regions A–H. Remote control 504 includes a tab function 520, a scroll function 522, and an enter function 524. Responsive to actuation of the tab function, region A is brought into focus, as shown in the second frame. Link one is highlighted and A is enlarged, while the remaining regions are scaled so that A is much larger relative to the other regions, thereby accomplishing a zoom function and improving readability of the information contained in region A. This is shown as web page 512. If, when A is in focus, the user actuates scroll function 522, a second link in region A is highlighted as shown on page 514. In one embodiment, scrolling within the focus region does not effect the size or representation of the non-focus regions. In the event that, at web page 512 or web page 514, the enter function 524 is actuated, $link_1$ or $link_2$ would be traversed, respectively. If the segments are actually associated with their alphanumeric designator, and that remote control 504 has alphanumeric keys, for example, letter key F 526, web page 516 shows a web page that would be reached from web page 510, 512, or 514 responsive to actuation of the F key. In web page 516, the F region is in focus, and the remaining regions are scaled to be much smaller than the F region.

These are merely illustrative examples of the tab, scroll, and zoom features of one embodiment of the invention. While the shown embodiment tiles the regions, it is within the scope and contemplation of the invention to overlay the focus region on one or more of the other regions. It is also within the scope of the invention to permit a user to increase the zoom of the focus region to exceed the physical space. In such case, scrolling within the region may be required to view the entire contents of the region. Such scrolling need not effect the display of the non-focused regions.

Figure 6:
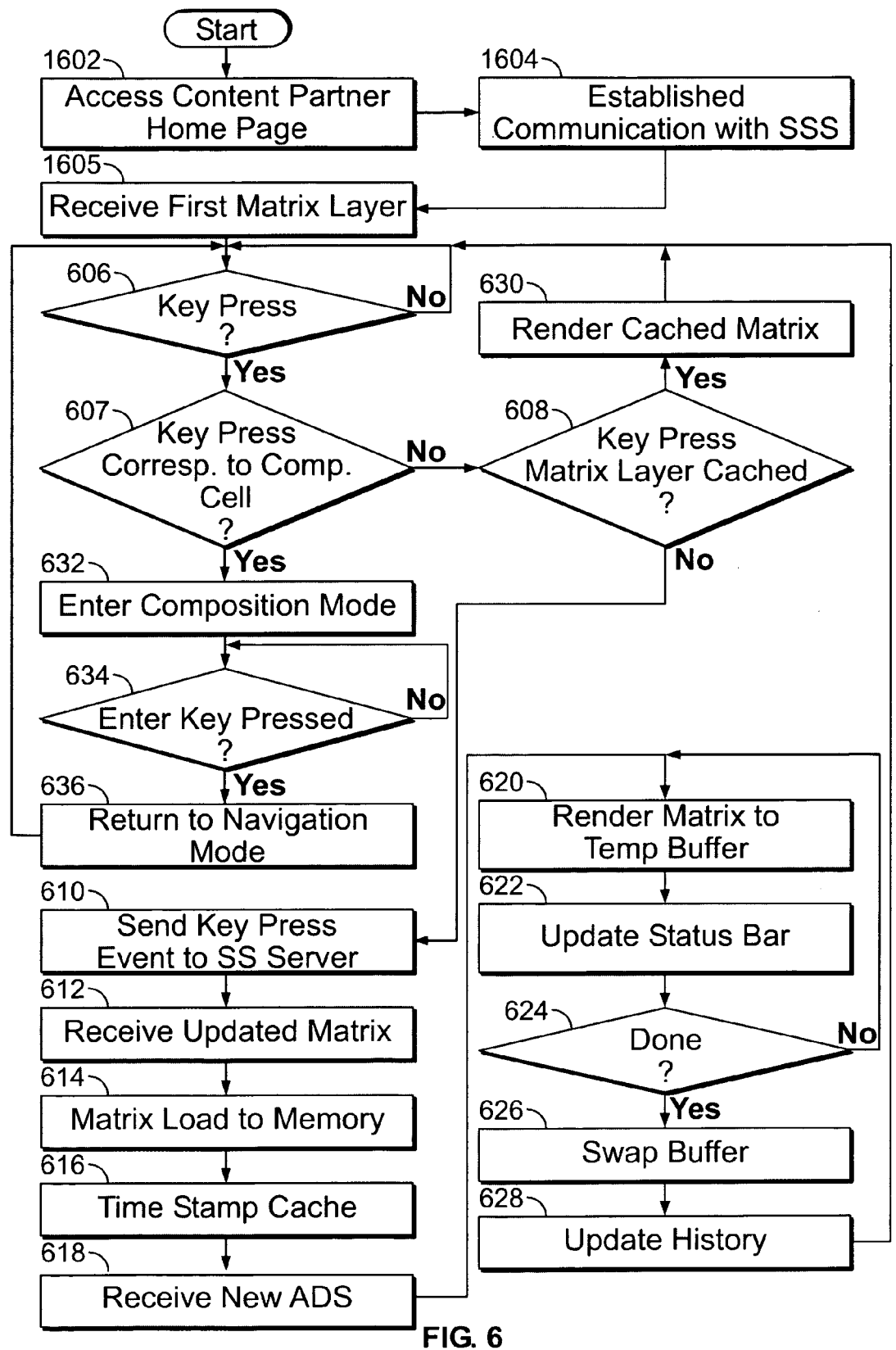
FIG. 6 is a flow chart of operations of the navigation system of one embodiment of the invention in a custom terminal custom browser node.

FIG. 6 is a flow chart of operations of the navigation system of one embodiment of the invention in a custom terminal custom browser node. Upon power-up at functional block 602, a content partners home page is accessed. In some embodiments, it may be possible to bypass access of the home page and go directly to the sister site home page. At functional block 604, a node establishes communication with a sister site server (SSS). At functional block 605, a first matrix layer is received from the SSS. At decision block 606, the node waits for a keypress. If at decision block 606, a determination is made that a key has been pressed, a determination is made at decision block 607 whether the keypress corresponds to a composition cell. A composition cell is deemed to be a cell in the navigation matrix which permits a user to enter additional data. For example, a search cell or e.g., a purchase order form or an e-mail may have one or more composition cells. If the cell is a composition cell, the system enters composition mode at functional block 632. In composition mode, the digits of the keypad represent the digits themselves, rather than navigation options. The cursor will also appear in the composition field of the composition cell. At decision block 634, a determination is made if the enter key has been pressed. The enter key is defined in one embodiment of the invention to signify the end of a composition. Thus, if the enter key has not been pressed, the system remains in composition mode. However, if at decision block 634, the enter key has been pressed, the system returns to navigation mode at functional block 636. It is also within the scope and contemplation to define other keys to instigate return to the navigation mode.

If a keypress is received and not found to correspond to a composition cell at decision block 607, a determination is made at decision block 608 whether the matrix layer corresponding to the keypress exists within the cache. In this connection, it is determined whether a representation of that matrix layer, even if in the cache, is stale and therefore needs to be freshly downloaded. If the data is stale or not present in the cache at all, the keypress event is sent to the SSS. In one embodiment, the entire navigation path, including the keypress event, is sent with each keypress. When the navigation path is sent with each keypress event, the SSS is able to identify the requested matrix layer rapidly on the fly.

Subsequently, at functional block 612, the client node receives the updated matrix layer corresponding to the keypress event. That matrix layer is loaded to the memory at functional block 614 and the cache is time-stamped at functional block 616. At functional block 618, new ads may be received from the SSS. Notably, the receipt of the ads is asynchronous with the matrix layer receipt and may occur at any time without being prompted by a keypress event. At functional block 620, the incoming matrix layer is rendered to a temporary buffer by using a double-buffering technique. The actual rendering is transparent to the user. At functional block 622, the status bar for the load is updated to indicate the percent complete of the matrix layer rendering. At functional block 624, a determination is made if the rendering is complete. If it is not, the buffer continues to render and the status bar continues to update. By regularly updating the status bar, the user is not left wondering if the device is working. This is expected to limit the frustration experienced by many new users during the wait while matrix layers are rendered. If the rendering is complete, the temporary buffer is swapped with the frame buffer and the new matrix layer is displayed at functional block 626. Then at functional block 628, the history of the navigation path is updated to reflect the new matrix layer. The system then returns to await a next keypress to indicate further navigation. By iteratively pressing appropriate keys, a user may navigate to any desired depth up to a maximum depth along any navigation path and obtain content relevant to the path navigated. If instead, the matrix layer was validly in the cache at decision block 608, the matrix layer is rendered from the cache at functional block 630 and the system awaits the next keypress.

"Maximum depth" as used herein applies on a cell by cell basis for primary navigation options. A maximum depth is reached for a cell in a navigation path when pressing a corresponding key will not take a user to a deeper matrix layer in the matrix. While content, as distinguished from the matrix layer and their cell headings, will be displayed once a maximum depth is reached, it is within the scope and contemplation of the invention to display some content in cells of an intermediate matrix layer, i.e. one that is not at the maximum depth.

"Primary navigation options" as used herein are those navigation options that necessarily change between successive matrix layers, changing from general to more specific with increases in depth in the matrix.

Figure 7:
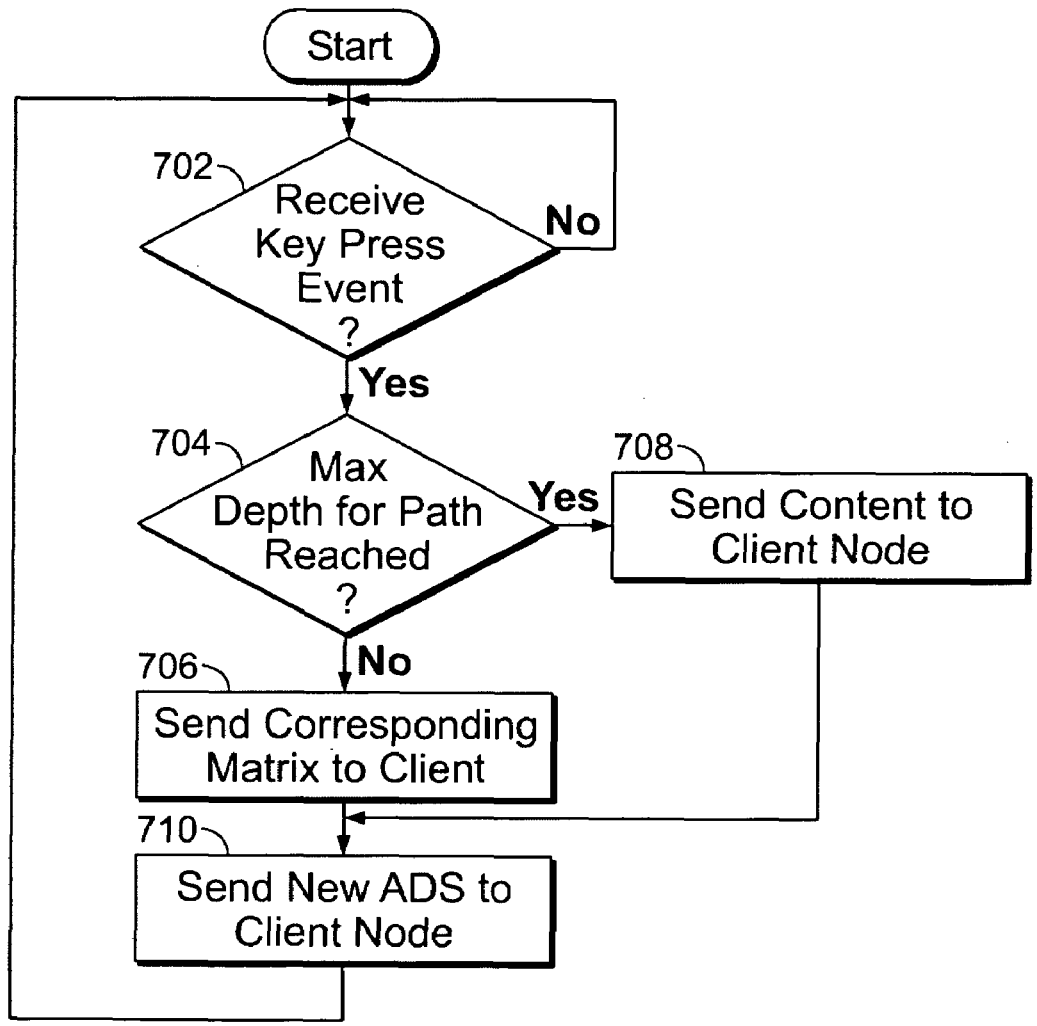
FIG. 7 is a flow diagram of operation of the sister site server of one embodiment of the invention.

FIG. 7 is a flow diagram of operation of the sister site server of one embodiment of the invention. A determination is made if the keypress event has been received at decision block 702. If the keypress event has been received, a determination is made if the matrix has reached maximum depth at decision block 704. If the matrix has not reached the maximum depth, a matrix layer corresponding to the keypress is sent at functional block 706. Such matrix layers may or may not include content in cells with navigation choices. If the matrix has reached maximum depth for that navigation path, a content layer corresponding to the keypress event is sent to the client node at functional block 708. A content layer may or may not include matrix cells in addition to the content. New ads are sent to the client node at functional block 710. The system then awaits the next keypress event from a client node.

Figure 8:
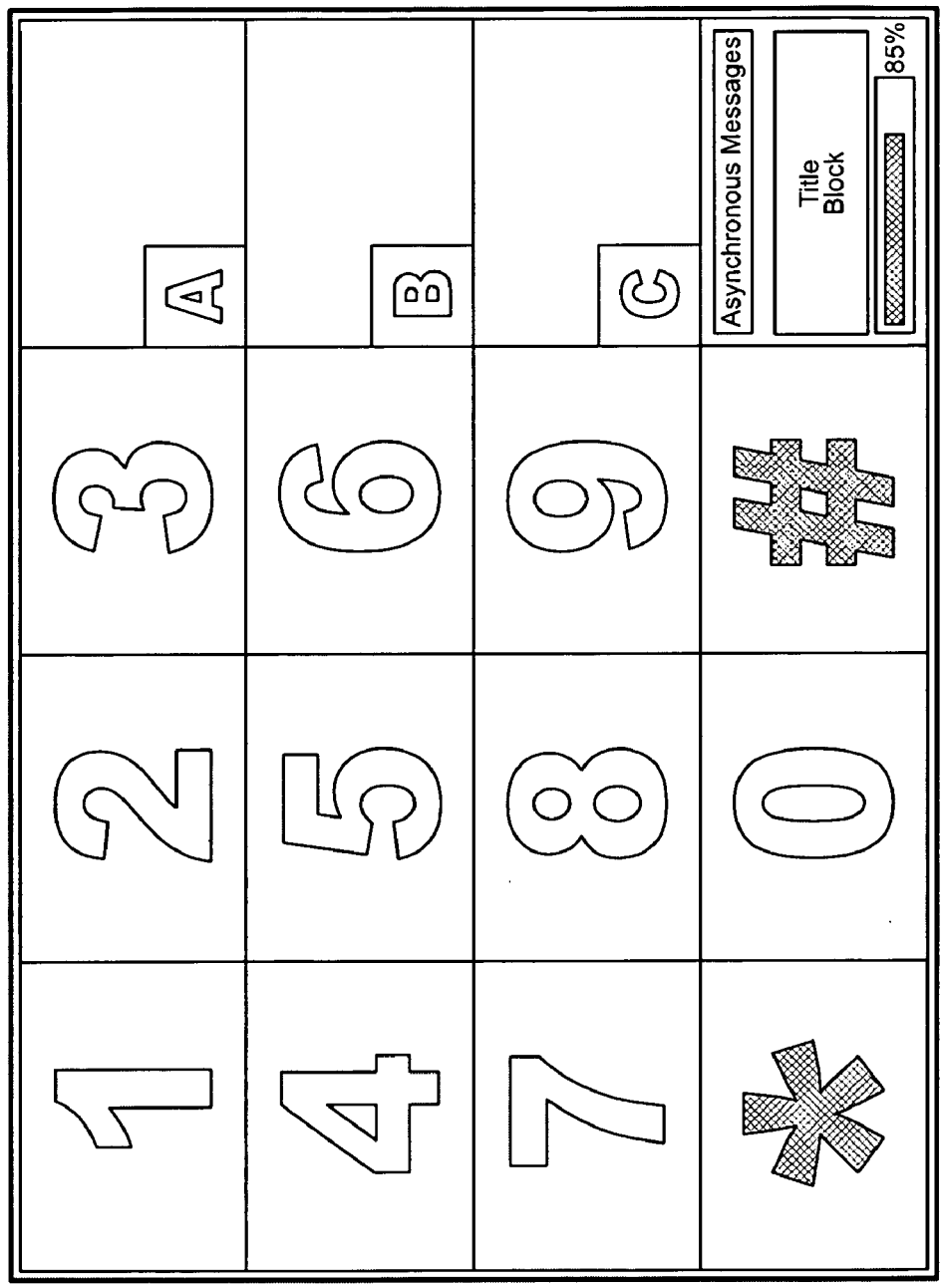
FIG. 8 is a diagram of the display of a graphical user interface of one embodiment of the invention.

FIG. 8 is a diagram of the display of a graphical user interface of one embodiment of the invention. The screen is divided into a plurality of cells. In this embodiment, there are fifteen cells that represent navigation options and one messaging cell for displaying messages from the server, the progress or status bar, and a title block. The cells can further be subdivided between the digit keys 1–9 keys which, in this embodiment, represent the primary set of navigation options and the keys designated by letters A–C which represent secondary navigation options and *, 0, and # keys that may be additional navigation options or provide specialized functions. For example, the * key may return the user to the server home site, thereby leaving matrix navigation. The ABC cells will typically hold advertising, and selecting one of those cells will generate a matrix layer with primary navigation cells directed to that advertiser or the product line being advertised. While the interface is designed to be fully accessible with minimal key strokes from a key pad, it is also within the scope and contemplation of the invention to permit selection with a mouse or other pointer device.

Figure 9A:
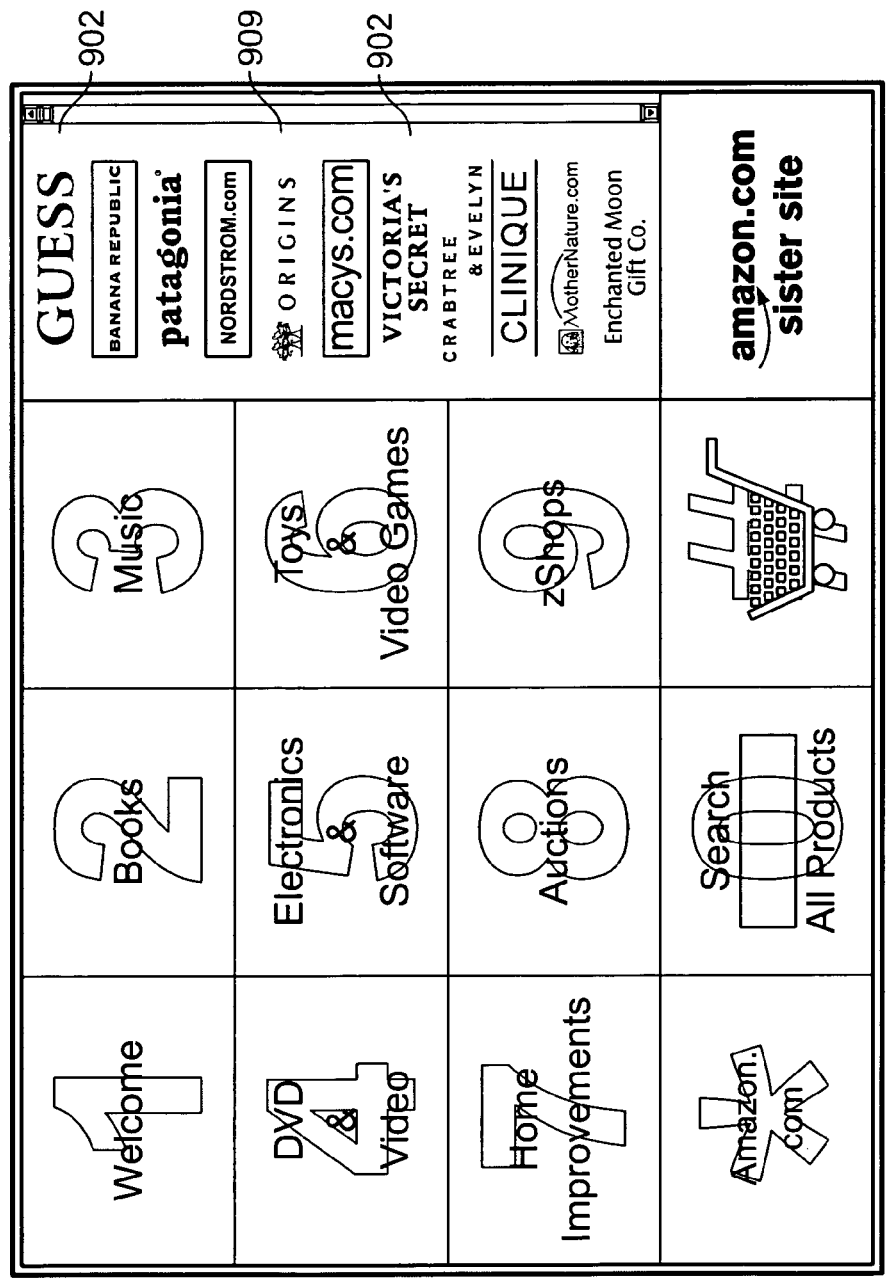
FIGS. 9a–d are examples of sister site matrix pages.
Figure 9B:
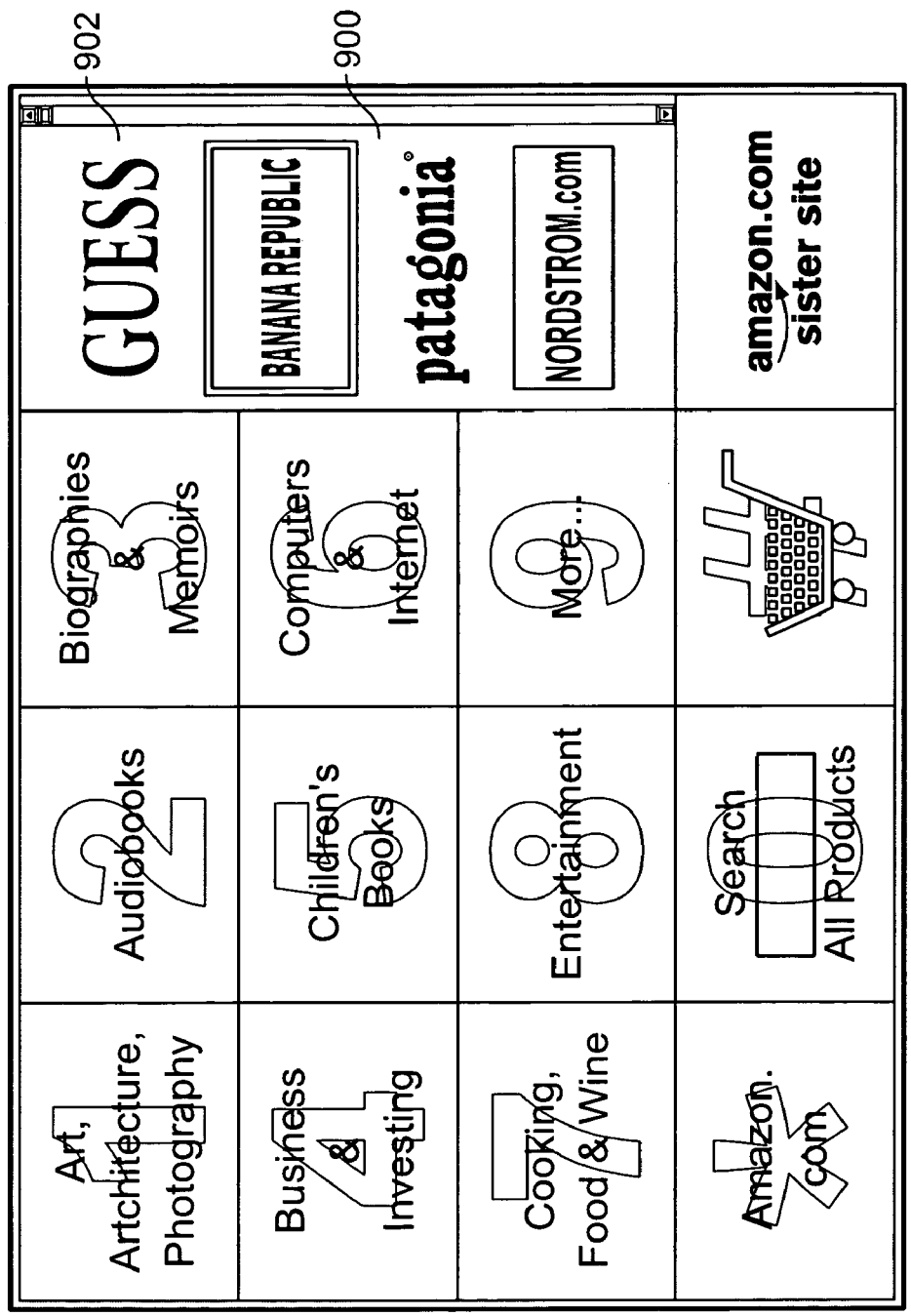
Figure 9C:
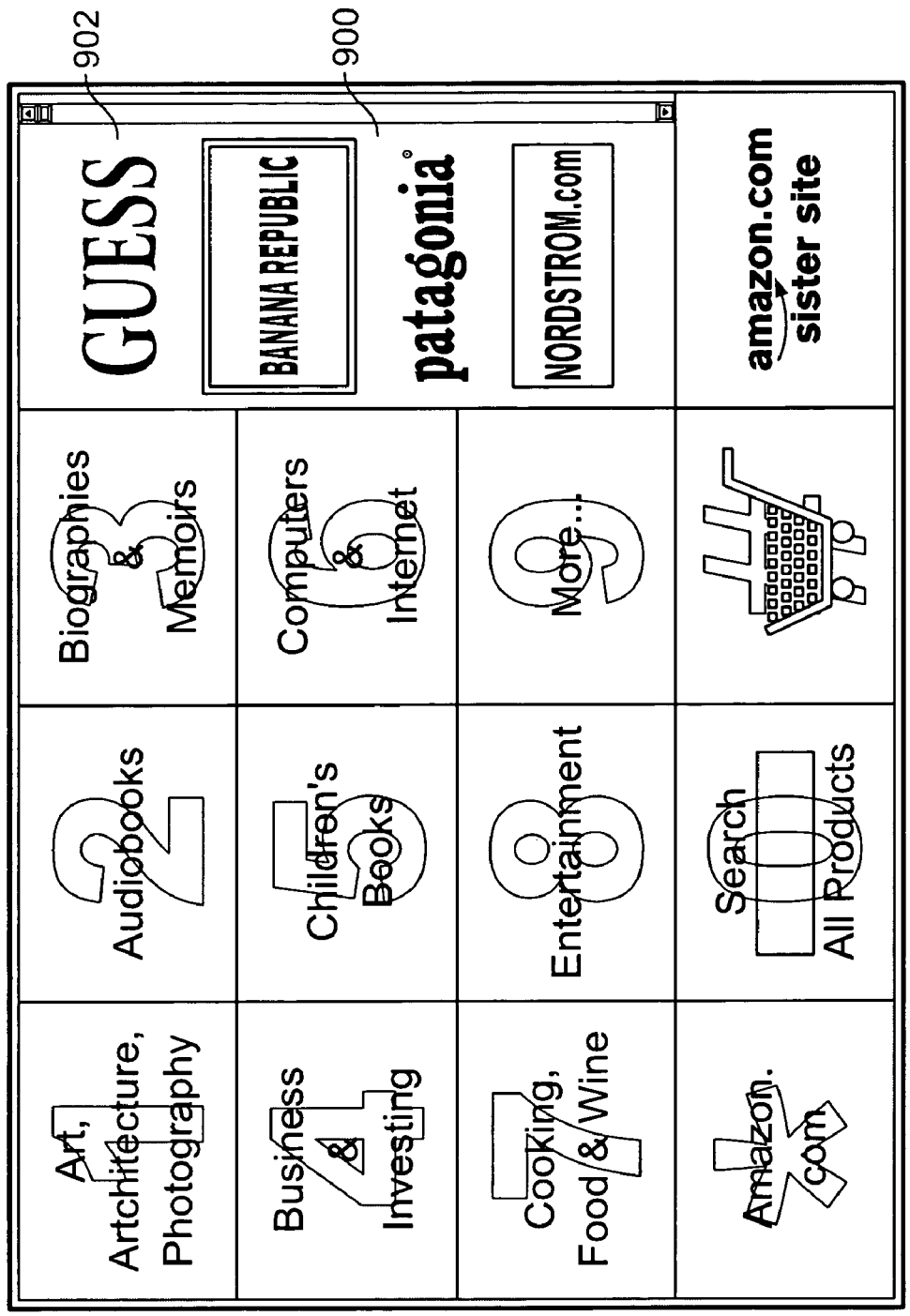
Figure 9D:
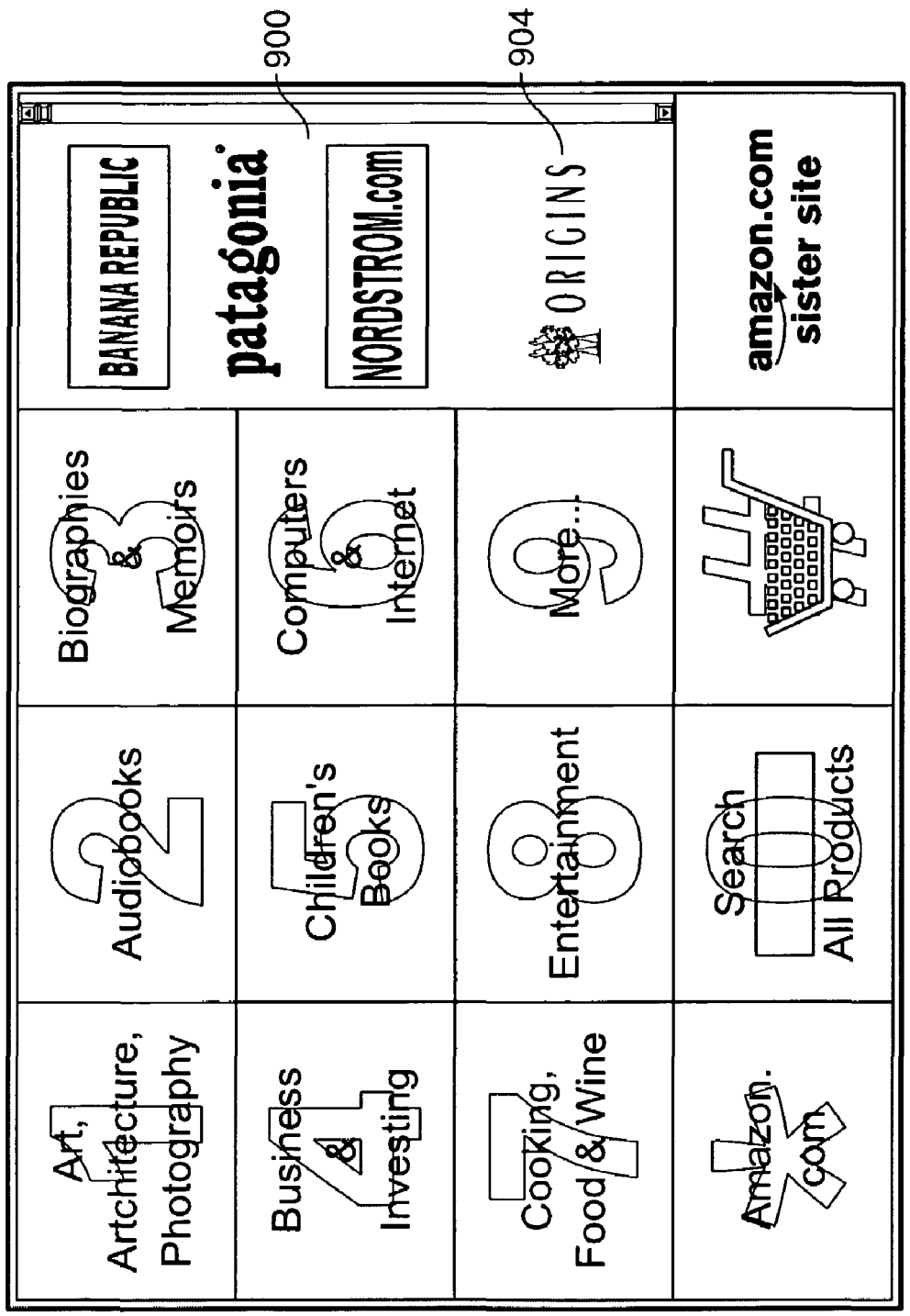

FIGS. 9*a*–*d* are example sister site matrix pages. In FIG. 9*a*, an advertising cell 900 is the focus region of the displayed image. Ten advertisements are displayed within the regions. The first advertisement 902 is highlighted. From this matrix page, the * returns a user to the amazon.com home page. The # reveals the contents of a user's shopping cart. In FIG. 9*b*, the contents of the focus window have been enlarged (zoomed) such that only four advertisements are displayed in ad cell 900. The no links/advertisements are highlighted. In FIG. 9*c*, advertisement 902 is again highlighted. This may occur, for example, by a user pressing a scroll key from FIG. 9*b*. In FIG. 9*d*, a user has pressed a scroll key several times from FIG. 9*c*. Thus, advertisement 902 has scrolled out of view and advertisement 904 is highlighted. While in this example, ten advertisements were present, the number of links within such a cell may be arbitrarily large. In the shown embodiment, scrolling through the links in the focus cell and scaling the focus cell content does not effect the user's view of the remaining cells.

FIGS. 10*a*–*g* are a series of matrix layers displayed during an exemplary navigation using one embodiment of the invention. In this example, navigation begins at the Shopping and Products matrix layer and shown in FIG. 10*a*. A selection of 5 on the 10*a* matrix layer yields an Electronics matrix layer shown in FIG. 10*b*.

Figure 10A:
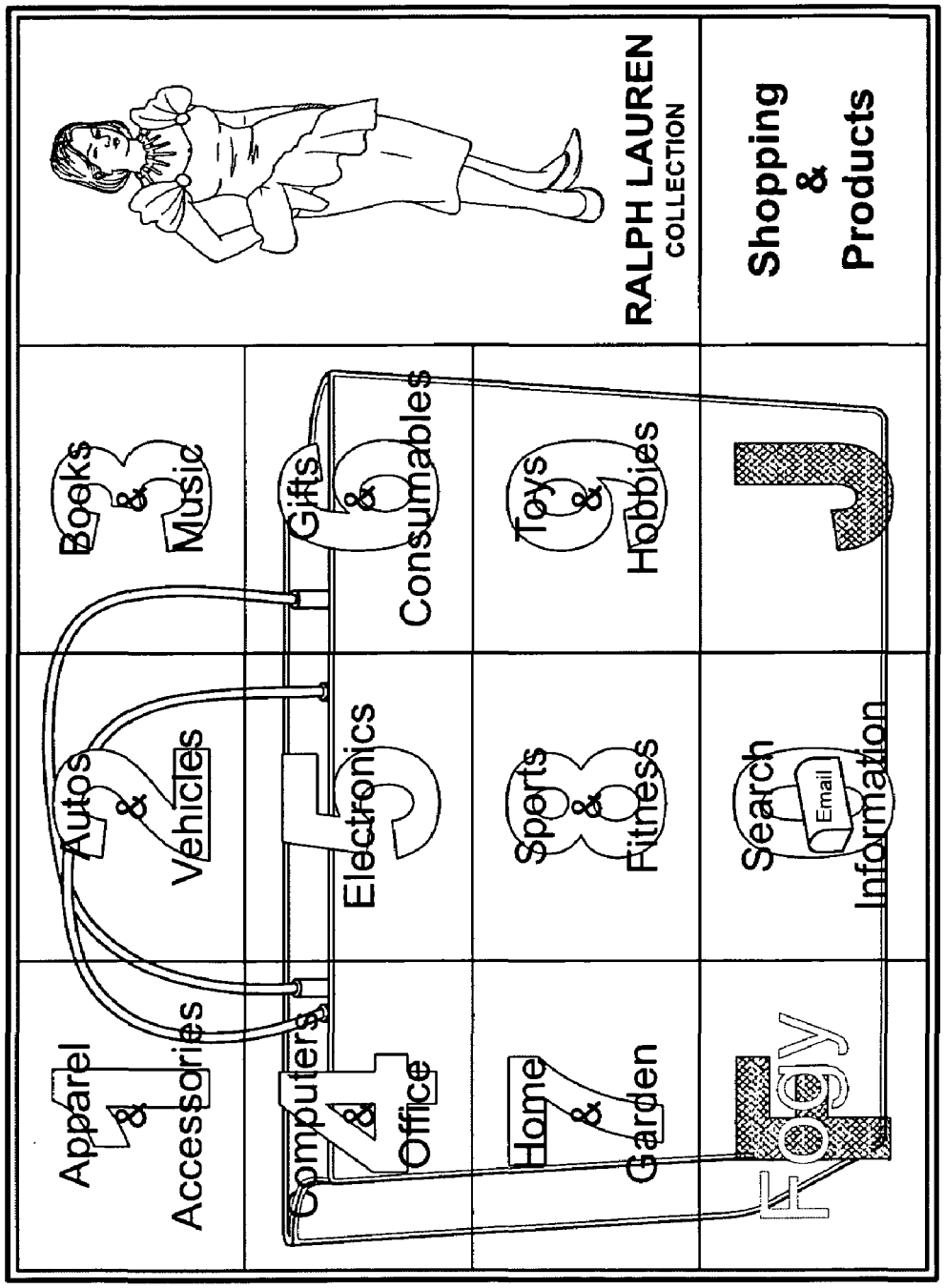
Figure 10B:
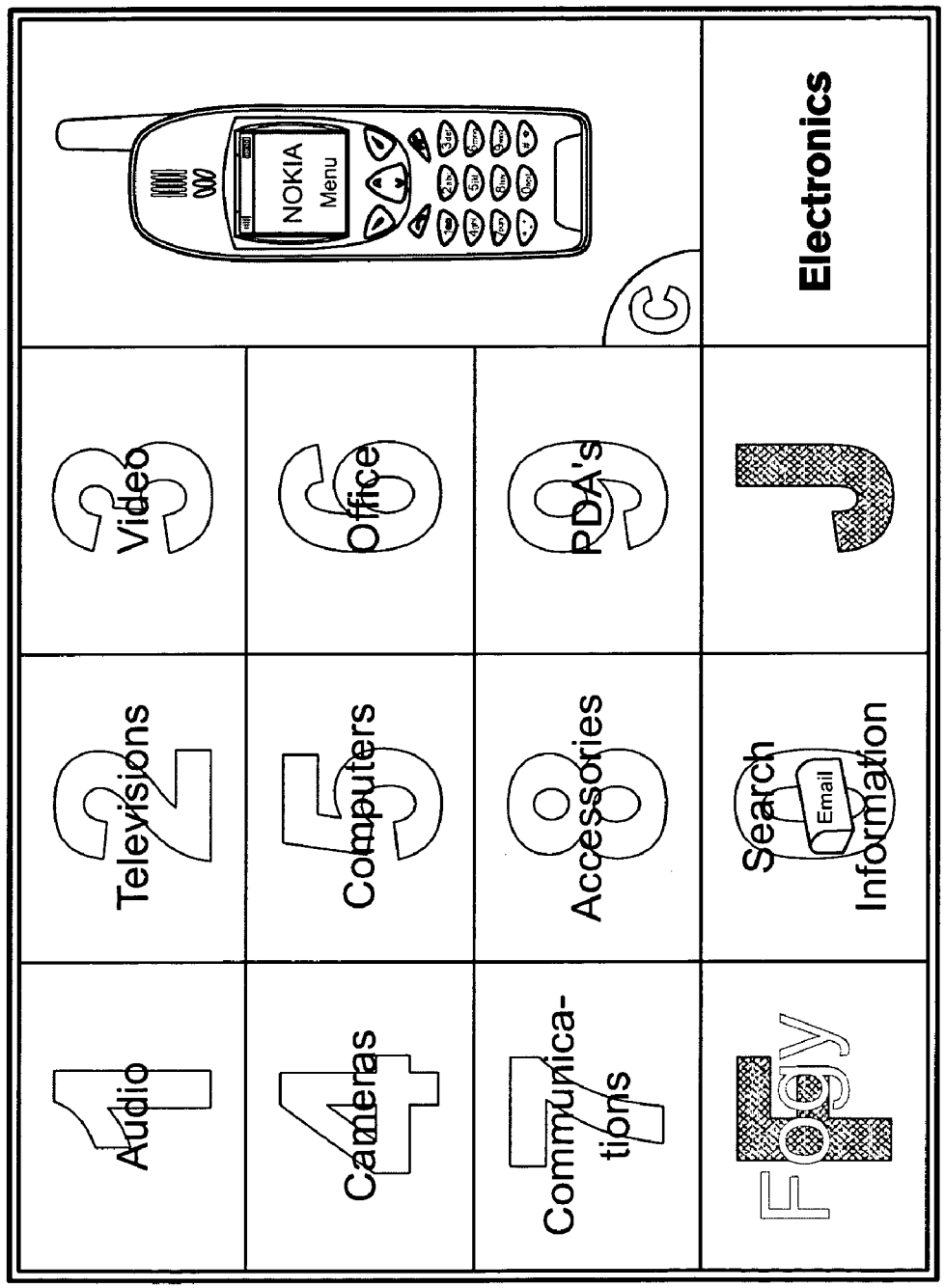
Figure 10C:
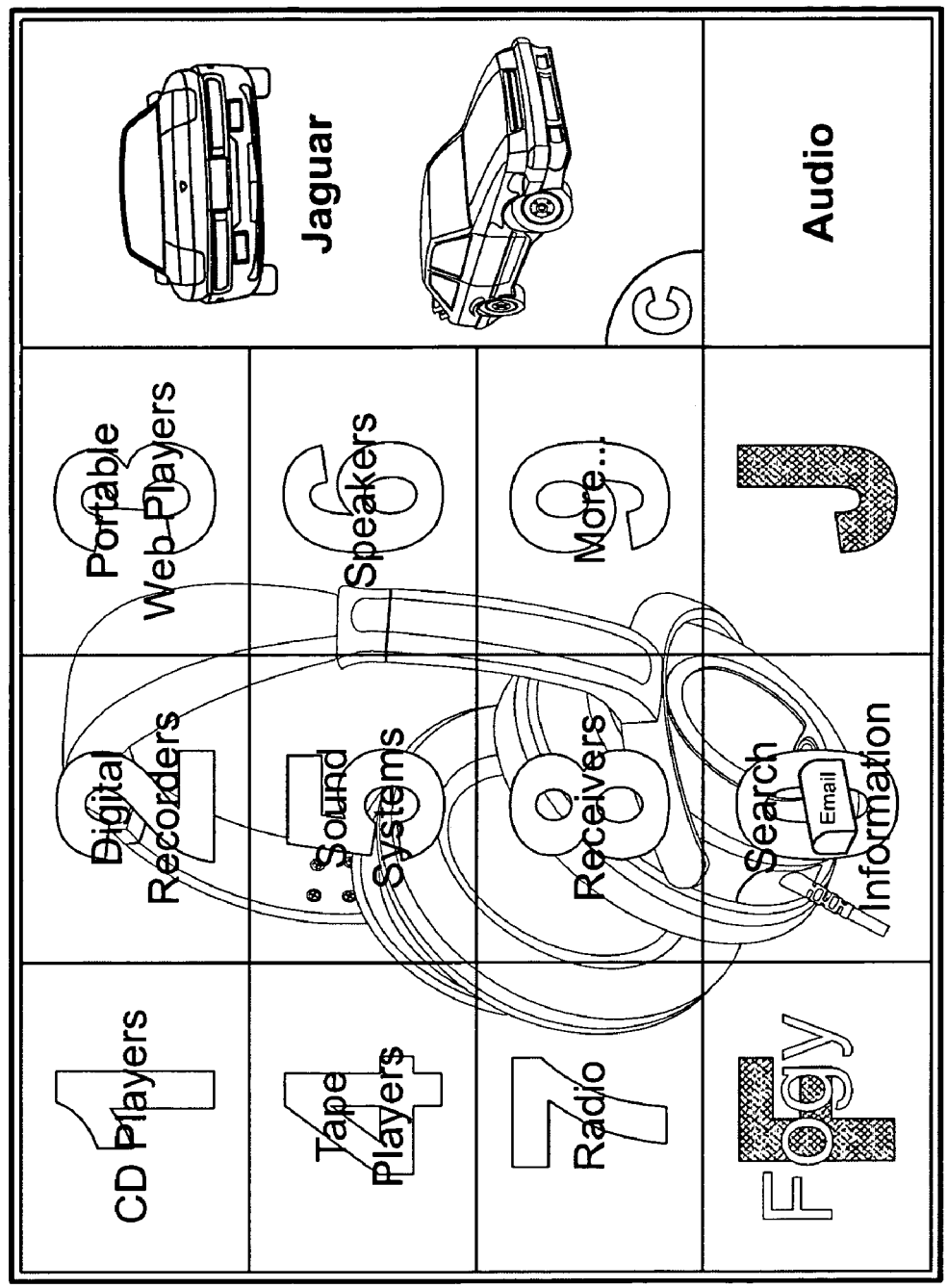
Figure 10D:
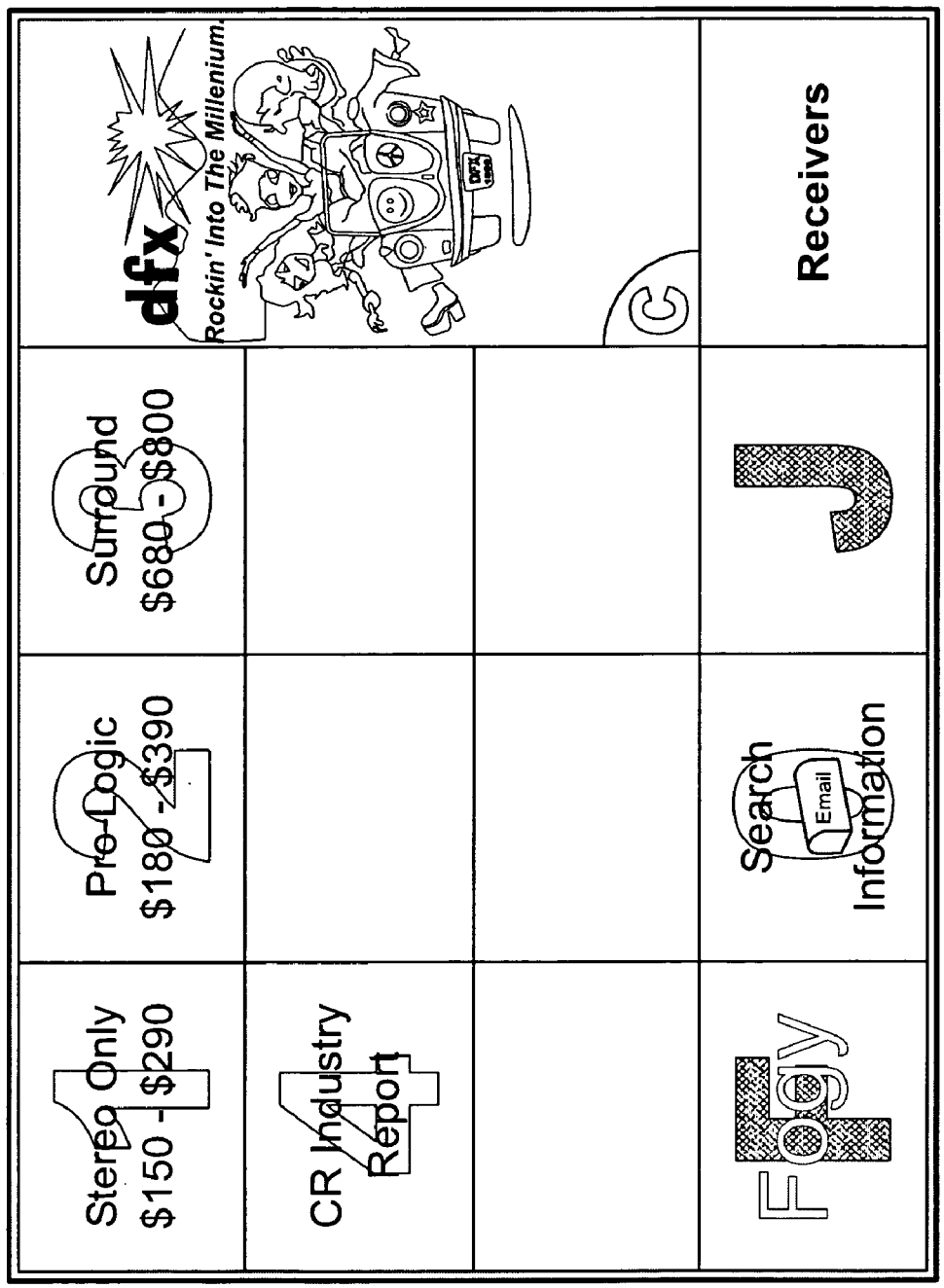
Figure 10E:
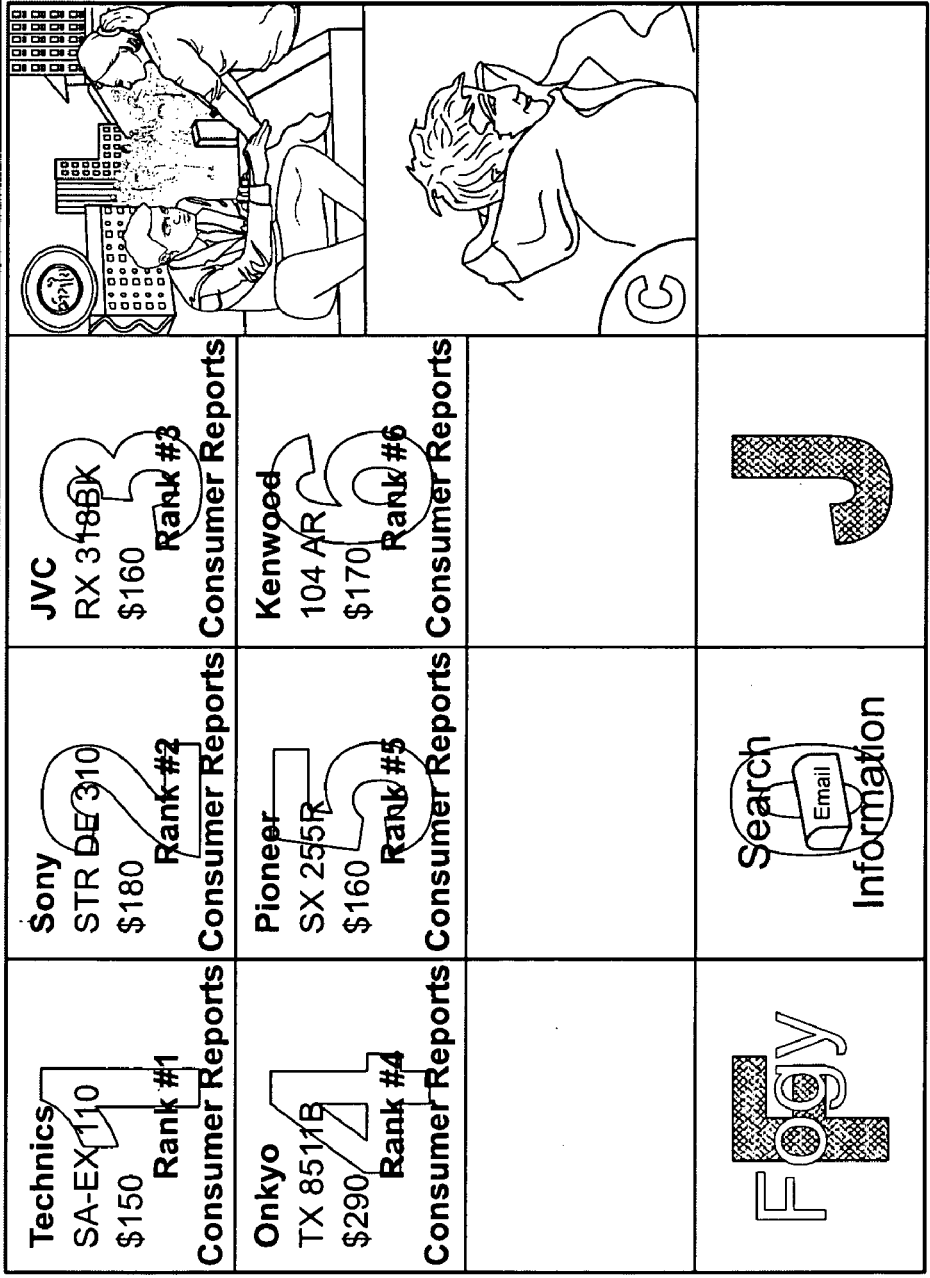

Selecting 1 on the keypad when the matrix layer of 10*b* is displayed yields the Audio matrix layer of FIG. 10*c*. By selecting an 8 on the keypad when 10*c* is displayed, the system displays a Receivers matrix layer of FIG. 10*d*, which breaks down receivers into price categories and also provides the option of navigating, in this embodiment, into Consumer Reports industry reports related to receivers. Notably, in FIG. 10*d*, the number of primary navigation options is reduced to 4. Thus, it is not necessary that all layers of the matrix have the same number of cells, nor is it required that all cells have the same size. A user can select Stereo Only by pressing 1 on the keypad, which yields a stereo only matrix layer shown in FIG. 10*e*.

In one embodiment of the invention, the products are ordered based on some ranking system, such as Consumer Reports. Thus, for example, in FIG. 10*e*, Technics received the highest ranking of receivers in the selected category from Consumer Reports. It is expected that for any particular product class, potential purchasers are likely to only be interested in the top several products within that class, not for example, the 15$^{th}$ best receiver in the $150–$290 range. However, it is within the scope and contemplation of the invention to permit a "more" option which allows a user to get a set of the next most highly ranked products and possibly unranked products as well. It is expected that supplying product options in a user-friendly ranked order will encourage users to be more willing to conduct e-commerce.

Figure 10F:
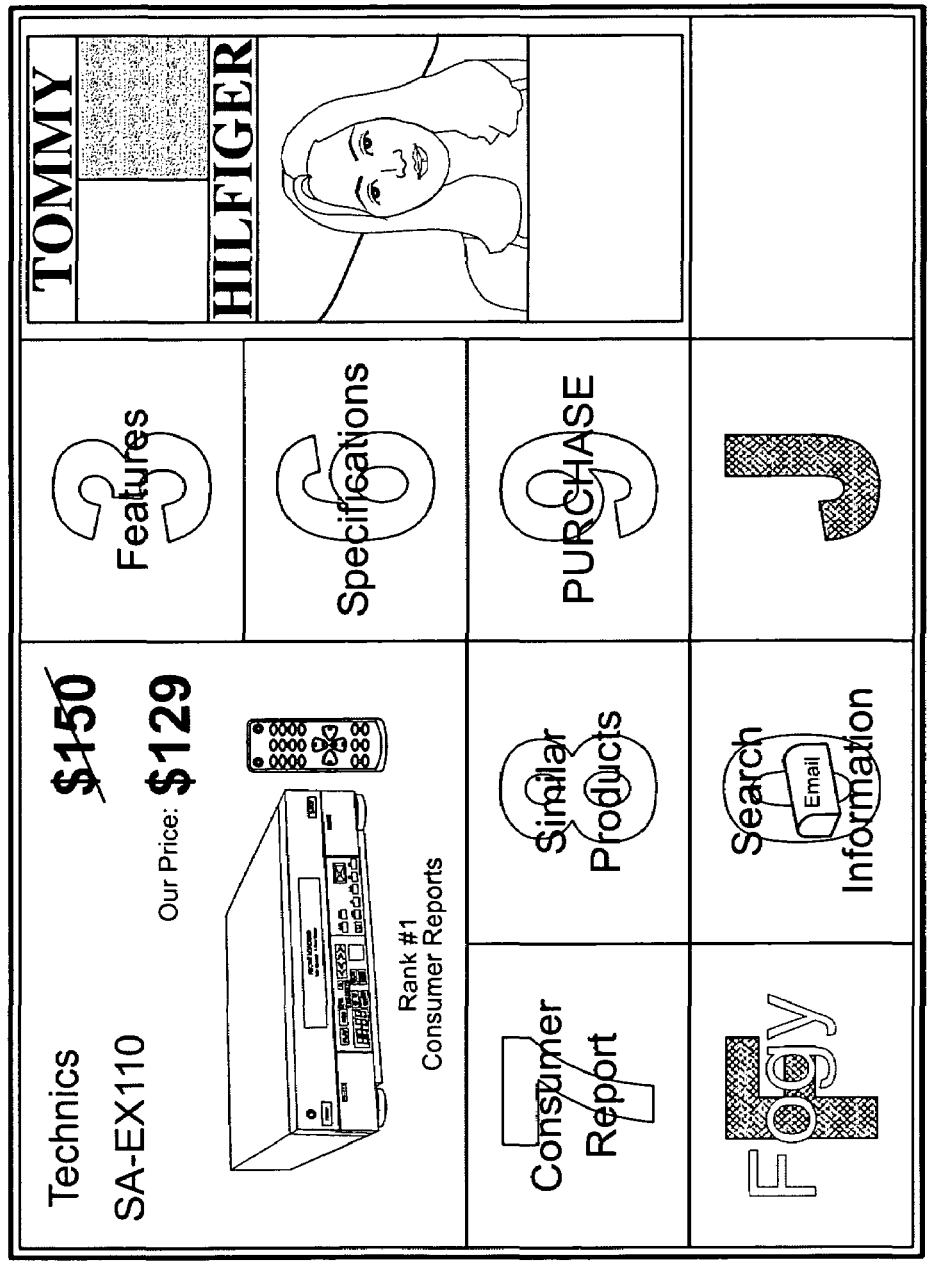
Figure 10G:
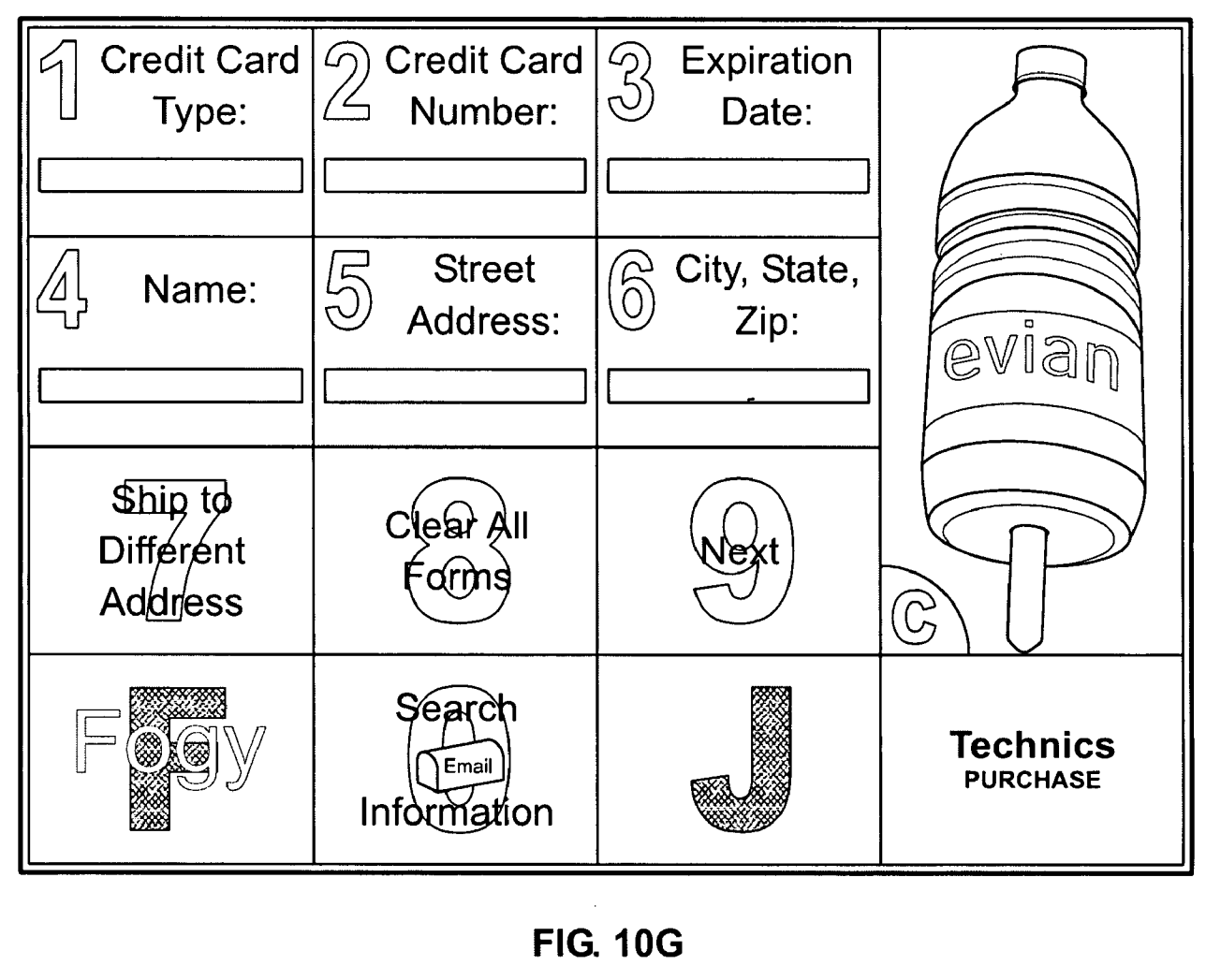

By selecting a 1 on the keypad when matrix layer 10e is displayed, a user reaches the matrix layer of FIG. 10f, as well as reaching the maximum depth for that navigation path. Thus, pressing 1 on the keypad in response to matrix layer 10f does not move the user deeper into the multi-dimensional matrix, and content is displayed in cell 1 indicating the model, price, picture, and possibly other information about the Technics product. Cell 1 is also larger than the other cells.

Other navigation options are provided in additional matrix cells surrounding cell 1 and its content. The additional cells represent navigation paths that have not reached their maximum depth. For example, by pressing a 3, one would get to a features of the Technics product content layer. Such screen would display features of the Technics system. The various navigation paths typically have a maximum depth at which content is displayed. However, reaching the maximum depth of a particular navigation path does not indicate that another navigation path may not have yet a deeper matrix layer. For example, while the maximum depth of the navigation path corresponded to cell 1 has been reach in FIG. 10f, selecting a 9 on the keypad will move a user to a Technics purchase matrix layer, shown in FIG. 10g. By selecting digits on the keypad, a user can move between fields to fill out a purchase form which, as discussed above, is one example of a matrix layer including composition cells. In some embodiments, the form can be filled in using keyboard input. In other embodiments, the speech to text capabilities of the terminal will permit the user to fill out the electronic purchase form orally.

Figure 11:
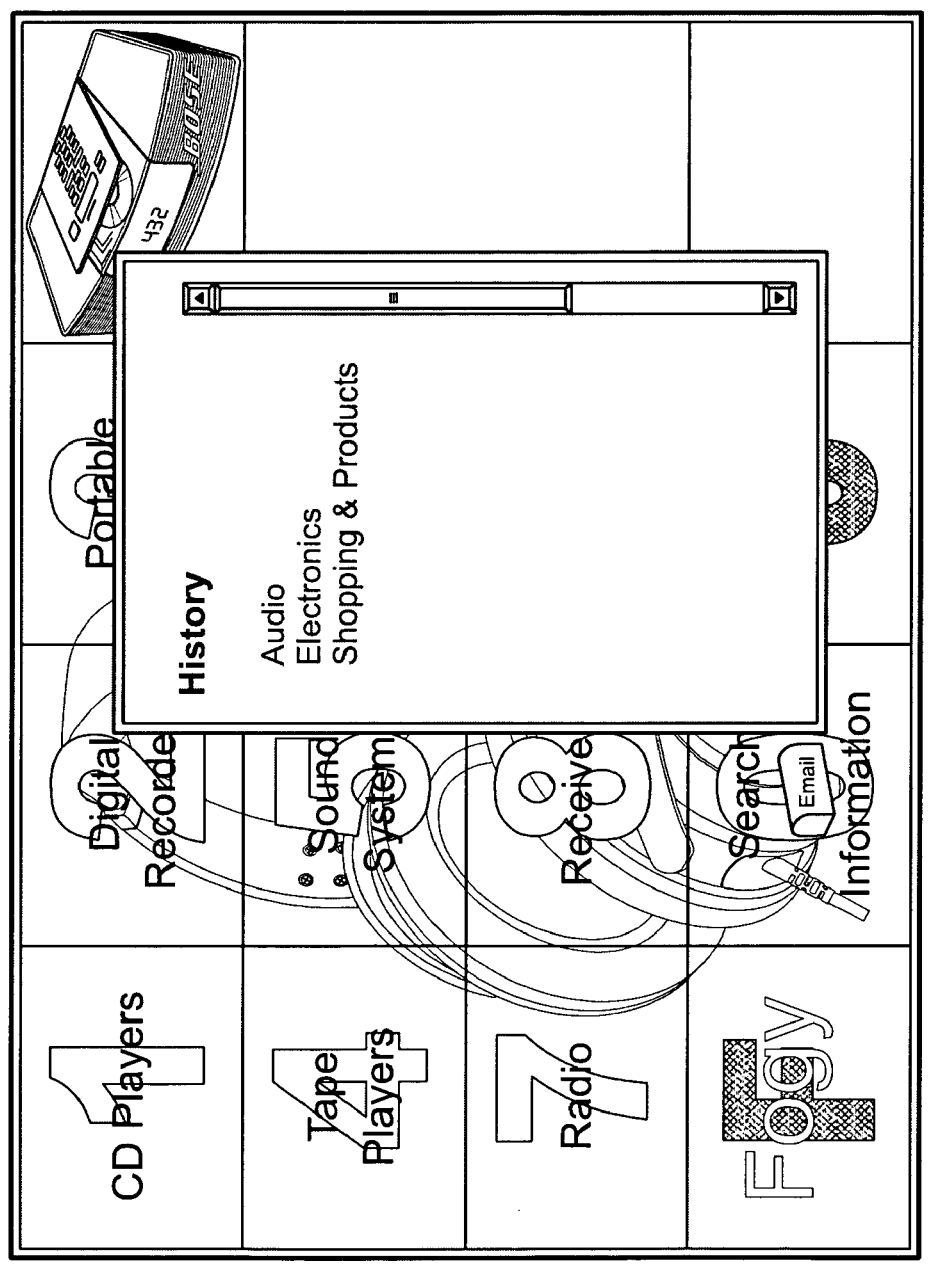
FIG. 11 shows a history window overlying a navigation matrix layer.

FIG. 11 shows a history window overlying a navigation matrix. The history window would appear if the history button on the keypad were actuated. By using the up/down arrow key on the keypad, the user may then select a prior matrix to jump to directly without moving backwards or forwards iteratively.

Figure 12A:
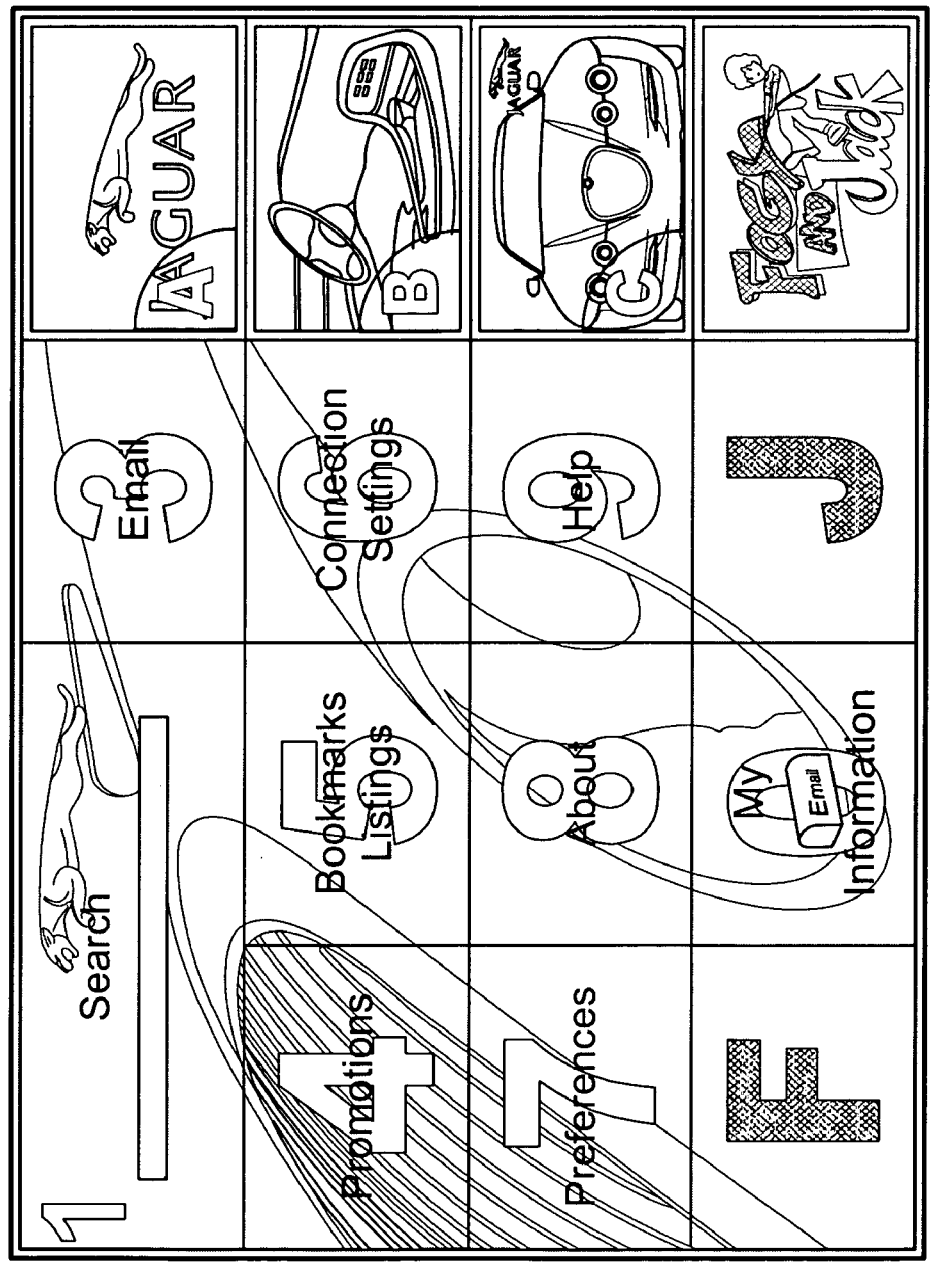
FIGS. 12a and b are an example of a matrix layer of one embodiment of the invention.
Figure 12B:
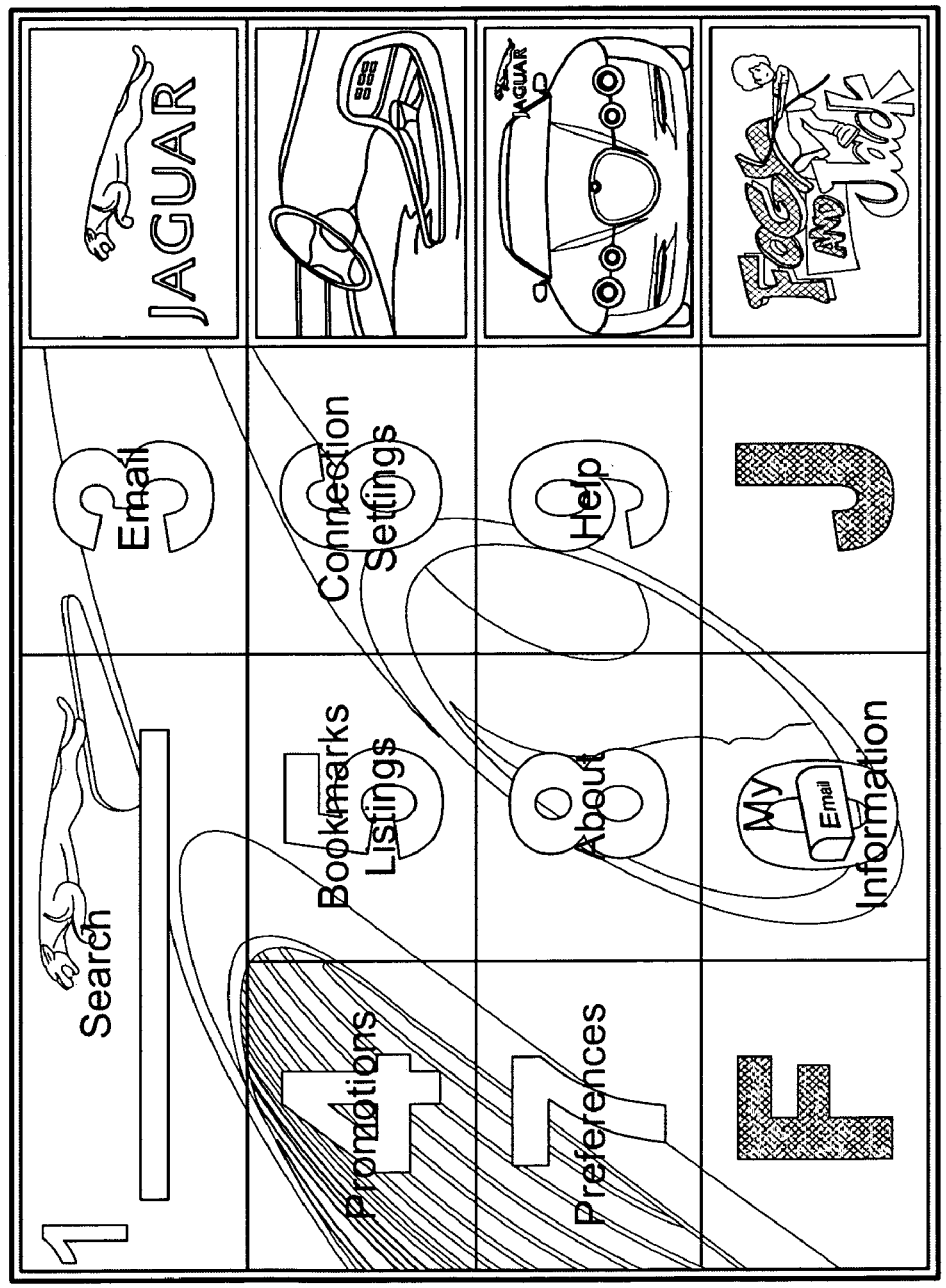

FIGS. 12a and b are an example matrix after a selection of 0 from the main menu screen, which allows one to conduct a search through cell 1. On this figure, advertisements for Jaguar appear in the ABC cells. In one embodiment of the invention, the ABC designation appears initially (as shown in FIG. 12a) when the screen is first refreshed and then fades away to reveal solely the advertisement in each of those cells (as shown in FIG. 12b). In this example, pressing an A on the keypad would take the user to a matrix reflecting company information about Jaguar. Pressing B would take the user to a matrix for the virtual showroom, and C would take the user to a purchase screen for the advertised item.

In some cases, the advertising cells are merged as a single cell showing a single advertisement and permitting navigation to only a single matrix layer therefrom. In one embodiment, the background can be an advertisement. This is also shown in FIGS. 12a and b. Significantly, the advertisement can be targeted by modifying the ad responsive to the apparent navigation path of the user. This leaves the potential of showing the user an advertisement for a product or service more likely to be of interest. For example, when a user selects Electronics in the example of FIGS. 10a–g, the next screen may have as background an advertisement, e.g. for Circuit City.

Figure 13:
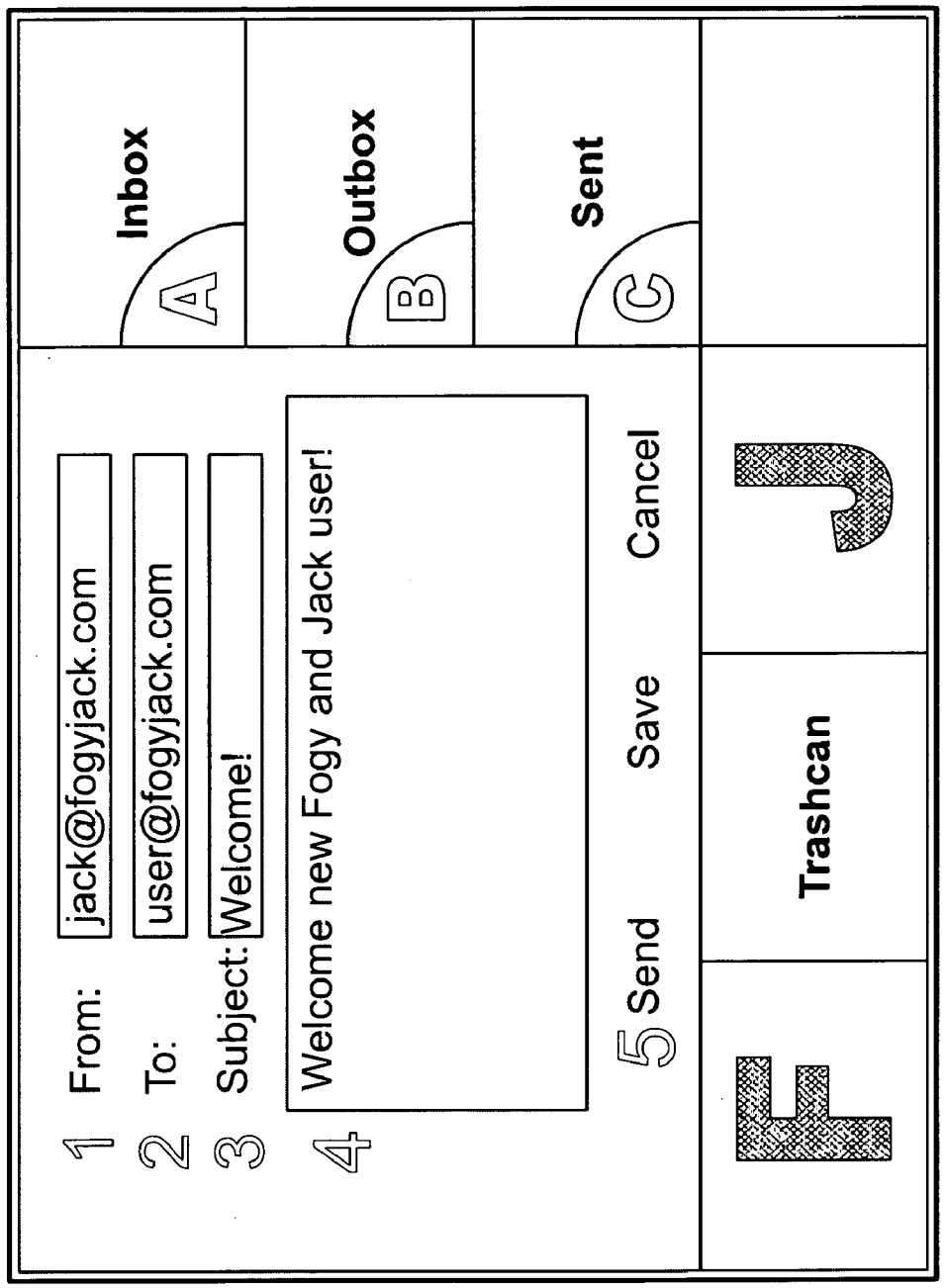
FIG. 13 is an e-mail composition matrix layer for one embodiment of the invention.

FIG. 13 shows the e-mail creation screen for one embodiment of the invention. This would be reached by pressing 3 on the keypad when the matrix layer of FIG. 9d is displayed. Again, all e-mail functions other than actually entering the text and the address can be performed using the simple interface with numerical digits and the letters ABC corresponding to inbox, the outbox, and the sent features of standard e-mail, respectively.

Figure 14:
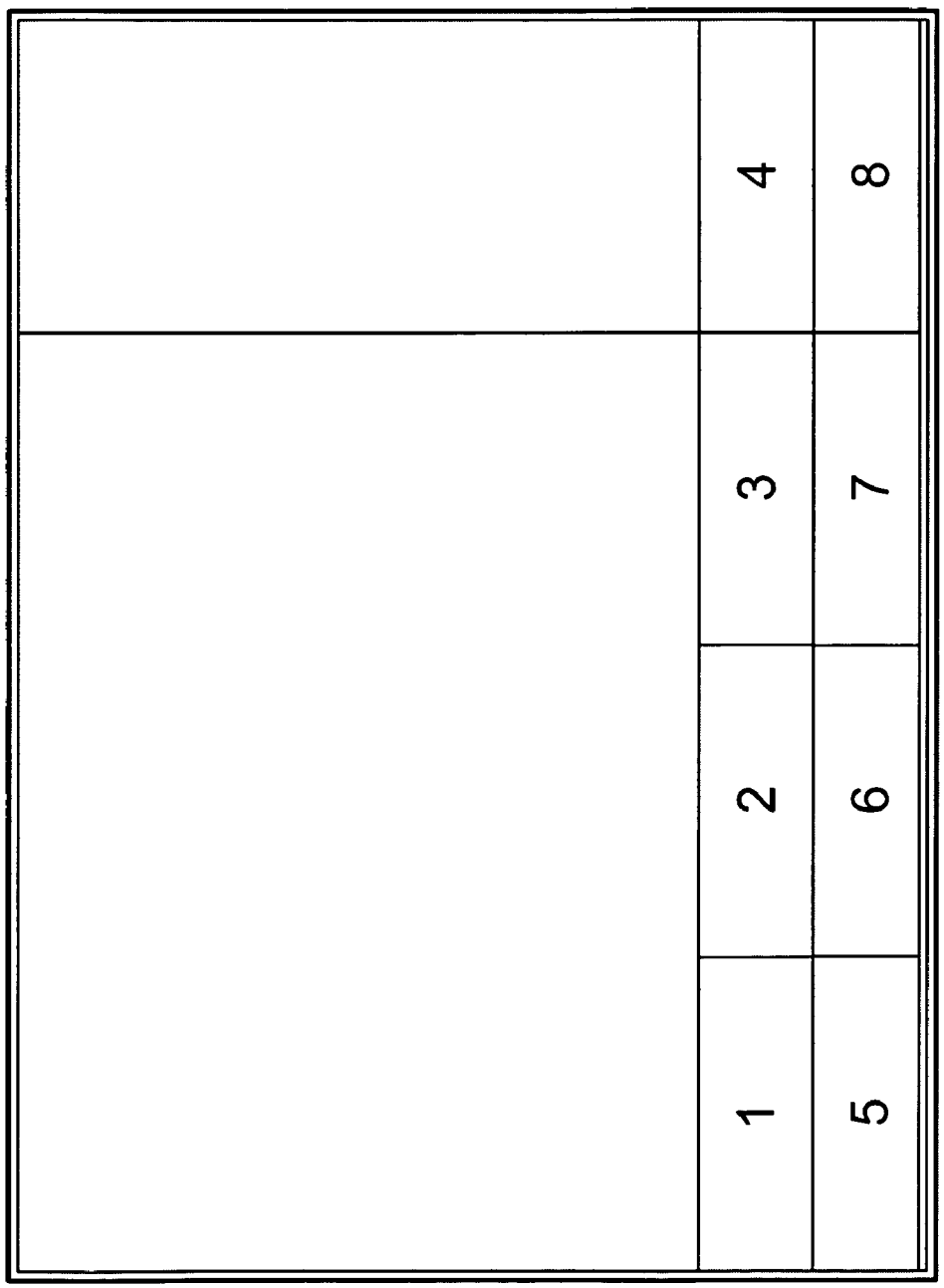
FIG. 14 shows an alternative matrix page of one embodiment of the invention.

FIG. 14 shows an alternative matrix page of one embodiment of the invention. In this embodiment, the matrix occupies only a portion of the screen real estate. The remaining real estate may be occupied by content, a zoom of the focus cell, or advertising.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A method comprising:
providing a webpage associated with a sister site; and
providing a simplified navigation interface for the webpage by the sister site.

2. The method of claim 1 wherein the simplified navigation interface employs a multi-layered matrix navigation, the method further comprising:
accepting an alpha numeric indication of a navigation option, the navigation option displayed by the navigation interface; and
serving a matrix layer corresponding to the navigation option.

3. The method of claim 1 further comprising:
transcoding a hyper text markup language (HTML) page into an extensible markup language (XML) page; and
applying a document type definition (DTD) to the XML page.

4. The method of claim 3 further comprising:
formatting the XML page using extensible style language (XSL); and
transforming the formatted page into one of extensible hyper text markup language (XHTML) and HTML.

5. The method of claim 3 further comprising:
applying a cascading style sheet (CSS) to the XML page.

6. A computer readable storage media containing executable computer program instructions which when executed cause a digital processing system to perform a method comprising:
providing a webpage associated with a sister site; and
providing a simplified navigation interface for the webpage by the sister site.

7. The computer readable storage media of claim 6 which when executed cause a digital processing system to perform a method further comprising:
accepting an alpha numeric indication of a navigation option, the navigation option displayed by the navigation interface; and
serving a matrix layer of a multi-layered matrix corresponding to the navigation option.

8. The computer readable storage media of claim 6 which when executed cause a digital processing system to perform a method further comprising:
- transcoding a hyper text markup language (HTML) page into an extensible markup language (XML) page; and
- applying a document type definition (DTD) to the XML page.

9. The computer readable storage media of claim 8 which when executed cause a digital processing system to perform a method further comprising:
- formatting the XML page using extensible style language (XSL); and
- transforming the formatted page into one of extensible hyper text markup language (XHTML) and HTML.

10. The computer readable storage media of claim 8 which when executed cause a digital processing system to perform a method further comprising:
- applying a cascading style sheet (CSS) to the XML page.

11. The method of claim 1, further comprising:
- displaying the navigation interface on a television set, the television set having a remote control.

12. The method of claim 1, further comprising:
- displaying the simplified navigation interface on a portable wireless device.

13. The method of claim 1, wherein a sister site is a server on a network.

14. The computer readable storage media of claim 6, further comprising:
- displaying the navigation interface on a television set, the television set having a remote control.

15. The computer readable storage media of claim 6, further comprising:
- displaying the simplified navigation interface on a portable wireless device.

16. The computer readable storage media of claim 6, wherein a sister site is a server on a network.

17. The method of claim 1, wherein the webpage contains commercial content.

18. The computer readable storage media of claim 6, wherein the webpage contains commercial content.

19. The method of claim 1, further comprising:
- displaying the navigation interface via a computer system.

20. The computer readable medium of claim 6, further comprising:
- displaying the navigation interface via a computer system.

21. The method of claim 1, further comprising:
- providing a second webpage associated with the sister site; and
- providing the simplified navigation interface for the second webpage by the sister site.

22. The computer readable medium of claim 6, further comprising:
- providing a second webpage associated with the sister site; and
- providing the simplified navigation interface for the second webpage by the sister site.

23. The method of claim 1, wherein the simplified navigation option includes the use of primary navigation options.

24. The computer readable medium of claim 6, wherein the simplified navigation option includes the use of primary navigation options.

25. The method of claim 1, wherein the webpage is publicly accessible.

26. The computer readable medium of claim 6, wherein the webpage is publicly accessible.

27. The method of claim 2, further comprising:
- displaying purchasing information related to at least one item via the matrix layer.

28. The computer readable medium of claim 6, further comprising:
- displaying purchasing information related to at least one item via the matrix layer.

29. The method of claim 1, wherein the simplified navigation interface includes a search form.

30. The computer readable medium of claim 6, wherein the simplified navigation interface includes a search form.

31. The method of claim 1, wherein the simplified navigation interface includes an email form.

32. The computer readable medium of claim 6, wherein the simplified navigation interface includes an email form.

33. The method of claim 2, further comprising:
- displaying a purchasing interface in response to receiving a navigation option input.

34. The method of claim 2, further comprising:
- displaying a purchasing interface in response to receiving a navigation option input.

35. The method of claim 21, wherein the simplified navigation interface includes a multi-layered matrix, and wherein each matrix layer includes multiple cells.

36. The method of claim 22, wherein the simplified navigation interface includes a multi-layered matrix, and wherein each matrix layer includes multiple cells.

* * * * *

UNITED STATES PATENT AND TRADEMARK OFFICE
CERTIFICATE OF CORRECTION

PATENT NO. : 7,020,845 B1  Page 1 of 1
APPLICATION NO. : 09/518015
DATED : March 28, 2006
INVENTOR(S) : Gottfurcht et al.

It is certified that error appears in the above-identified patent and that said Letters Patent is hereby corrected as shown below:

Title Page, Insert (73) Assignee: -- Gottfurcht; Elliot A. (Pacific Palisades, CA), Gottfurcht; Grant E. (Los Angeles, CA), Longstreet; Marlo L. (Los Angeles, CA) --.

In Item [74], Attorney, Agent, or Firm, please delete "Morrison & Foerster LLP" and insert -- Blakely Sokoloff Taylor & Zafman --.

Signed and Sealed this

Twenty-first Day of August, 2007

JON W. DUDAS
*Director of the United States Patent and Trademark Office*

(12) INTER PARTES REEXAMINATION CERTIFICATE (495th)

United States Patent
Gottfurcht et al.

(10) Number: US 7,020,845 C1
(45) Certificate Issued: Dec. 18, 2012

(54) NAVIGATING INTERNET CONTENT ON A TELEVISION USING A SIMPLIFIED INTERFACE AND A REMOTE CONTROL

(75) Inventors: Elliot A. Gottfurcht, Pacific Palisades, CA (US); Grant E. Gottfurcht, Pacific Palisades, CA (US); Albert-Michel C. Long, Irvine, CA (US)

(73) Assignee: EMG Technology, LLC, Woodland Hills, CA (US)

Reexamination Request:
No. 95/001,287, Dec. 21, 2009

Reexamination Certificate for:
Patent No.: 7,020,845
Issued: Mar. 28, 2006
Appl. No.: 09/518,015
Filed: Mar. 3, 2000

Certificate of Correction issued Aug. 21, 2007.

Related U.S. Application Data

(63) Continuation-in-part of application No. 09/440,214, filed on Nov. 15, 1999, now Pat. No. 6,600,497.

(51) Int. Cl.
*G06F 9/00* (2006.01)

(52) U.S. Cl. ........ 715/853; 715/748; 715/762; 715/810; 715/811

(58) Field of Classification Search .................. None
See application file for complete search history.

(56) References Cited

To view the complete listing of prior art documents cited during the proceeding for Reexamination Control Number 95/001,287, please refer to the USPTO's public Patent Application Information Retrieval (PAIR) system under the Display References tab.

*Primary Examiner* — Ovidio Escalante

(57) ABSTRACT

A method and apparatus of simplified navigation. A web page is provided having a link to a sister site. The sister site facilitates simplified navigation. Pages from the sister site are served responsive to actuation of the sister site link. In one embodiment, the sister site includes matrix pages to permit matrix navigation.

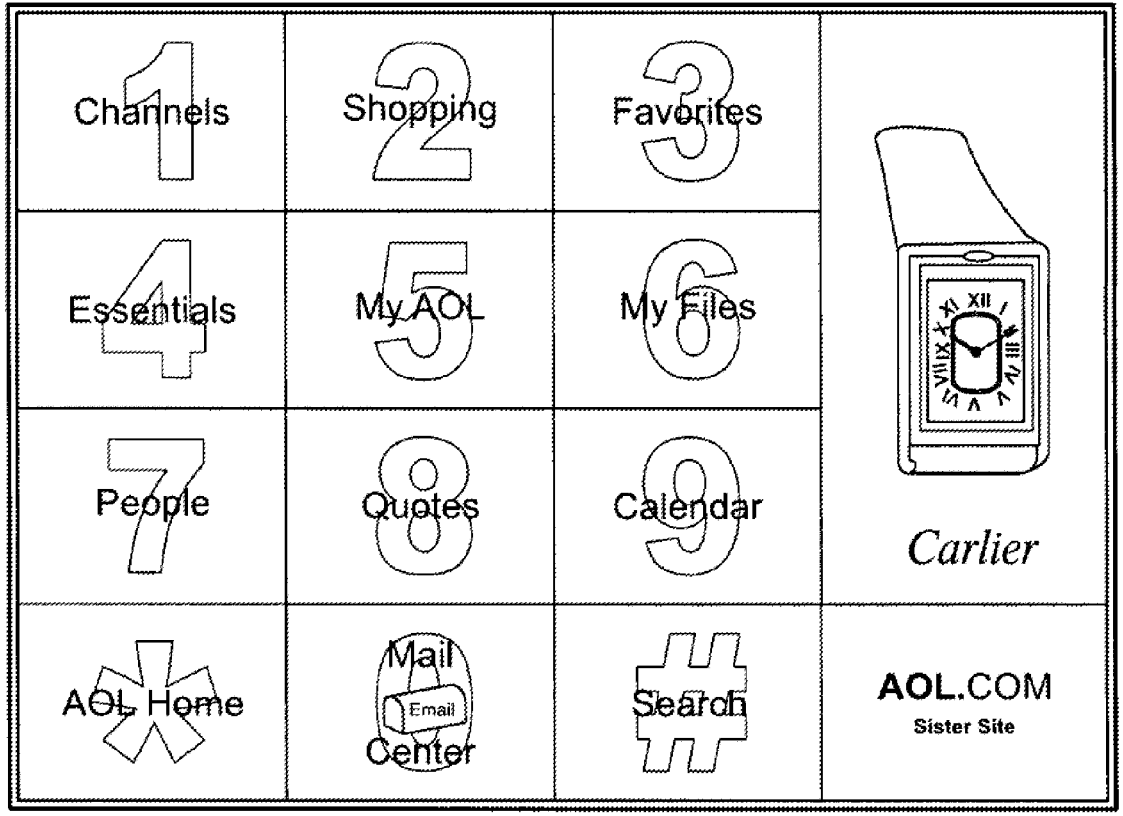

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-36 are cancelled.

\* \* \* \* \*